(12) United States Patent
Marcovitch et al.

(10) Patent No.: US 11,750,418 B2
(45) Date of Patent: Sep. 5, 2023

(54) CROSS NETWORK BRIDGING

(71) Applicant: MELLANOX TECHNOLOGIES, LTD., Yokneam (IL)

(72) Inventors: Daniel Marcovitch, Yokneam Illit (IL); Idan Burstein, Carmiel (IL); Liran Liss, Atzmon (IL); Hillel Chapman, Ramat Hashofet (IL); Dror Goldenberg, Zichron Yaakov (IL); Michael Kagan, Zichron Yaakov (IL); Aviad Yehezkel, Yokneam Illit (IL); Peter Paneah, Nesher (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 464 days.

(21) Appl. No.: 17/013,677

(22) Filed: Sep. 7, 2020

(65) Prior Publication Data

US 2022/0078043 A1    Mar. 10, 2022

(51) Int. Cl.
*H04L 12/46* (2006.01)
*G06F 13/40* (2006.01)
*G06F 13/42* (2006.01)
*G06F 15/173* (2006.01)

(52) U.S. Cl.
CPC ...... *H04L 12/4625* (2013.01); *G06F 13/4027* (2013.01); *G06F 13/4208* (2013.01); *G06F 15/17331* (2013.01); *H04L 12/4633* (2013.01); *G06F 2213/0026* (2013.01)

(58) Field of Classification Search
CPC ... G06F 3/0604; G06F 13/40; H04L 12/4625; H04L 12/4633; H04L 21/68707; H04L 63/1425; H04L 63/20
See application file for complete search history.

(56) References Cited

U.S. PATENT DOCUMENTS

| | | |
|---|---|---|
| 2007/0198763 A1 | 8/2007 | Suzuki et al. |
| 2015/0026384 A1 | 1/2015 | Maitra |
| 2015/0120855 A1 | 4/2015 | Izenberg et al. |
| 2016/0352651 A1 | 12/2016 | Egi et al. |
| 2016/0378709 A1 | 12/2016 | Menachem et al. |
| 2019/0171650 A1* | 6/2019 | Botev ................. G06F 16/2358 |

(Continued)

FOREIGN PATENT DOCUMENTS

EP    3276481 A1    1/2018

OTHER PUBLICATIONS

EP Application # 21195145.4 Partial Search Report dated Feb. 14, 2022.

(Continued)

*Primary Examiner* — Iqbal Zaidi
(74) *Attorney, Agent, or Firm* — KLIGLER & ASSOCIATES PATENT ATTORNEYS LTD

(57) ABSTRACT

A cross-network bridging apparatus includes a bus interface and bridging circuitry. The bus interface is configured for connecting to a system bus. The bridging circuitry is configured to translate between (i) system-bus transactions that are exchanged between one or more local devices that are coupled to the system bus and served by the system bus and one or more remote processors located across a network from the apparatus, and (ii) data units that convey the system-bus transactions, for transmitting and receiving as network packets over the network to and from the remote processors.

44 Claims, 12 Drawing Sheets

(56) References Cited

U.S. PATENT DOCUMENTS

2020/0210359 A1 7/2020 Cornett et al.
2020/0356485 A1* 11/2020 Winkelmann ........ G06F 11/349
2020/0364313 A1* 11/2020 Umbarger ............. G06F 30/327

OTHER PUBLICATIONS

EP Application # 21195145.4 Search Report dated May 16, 2022.
Meyer et al., "Disaggregated Computing. An Evaluation of Current Trends for Datacenters", ScienceDirect, Procedia Computer Science 108C, pp. 685-694, year 2017.
Yoshikawa et al., "Scalable Resource Disaggregated Platform That Achieves Diverse and Various Computing Services", NEC Technical Journal, vol. 9, No. 2, special issue on Future Cloud Platforms for ICT Systems, pp. 71-77, Jun. 2015.
Reano et al., "Analyzing the performance/power tradeoff of the rCUDA middleware for future exascale systems", Journal of Parallel and Distributed Computing, vol. 132, pp. 344-362, year 2019.
Shpiner et al., "RoCE Rocks without PFC: Detailed Evaluation", Proceedings of the Workshop on Kernel-Bypass Networks (KBNets'17), pp. 25-30, Los Angeles, USA, Aug. 21, 2017.
Guz et al., "NVMe-over-Fabrics Performance Characterization and the Path to Low-Overhead Flash Disaggregation", Proceedings of the 10th ACM International Systems and Storage Conference (SYSTOR 2017), pp. 1-9, Haifa, Israel, May 22-24, 2017.

\* cited by examiner

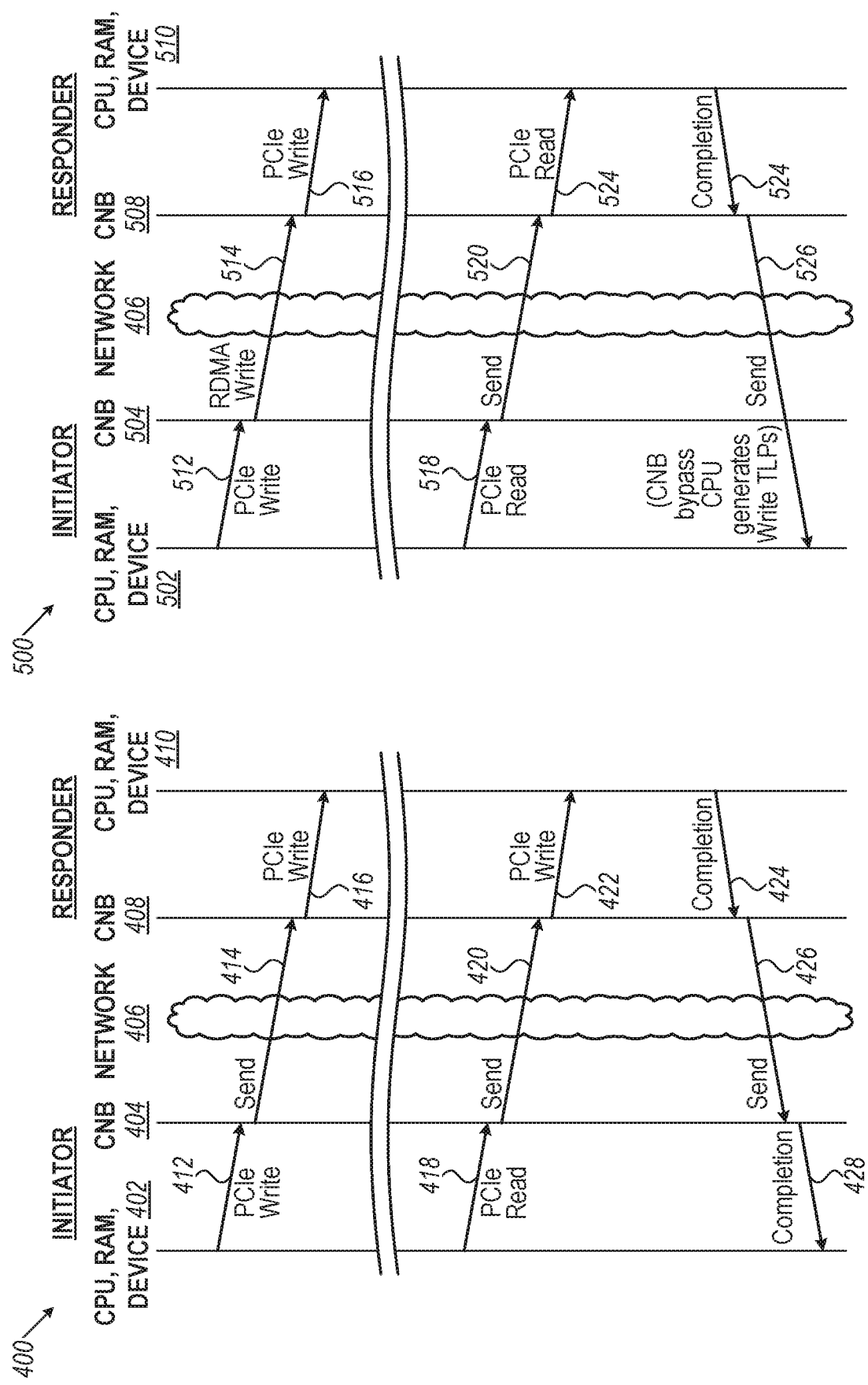

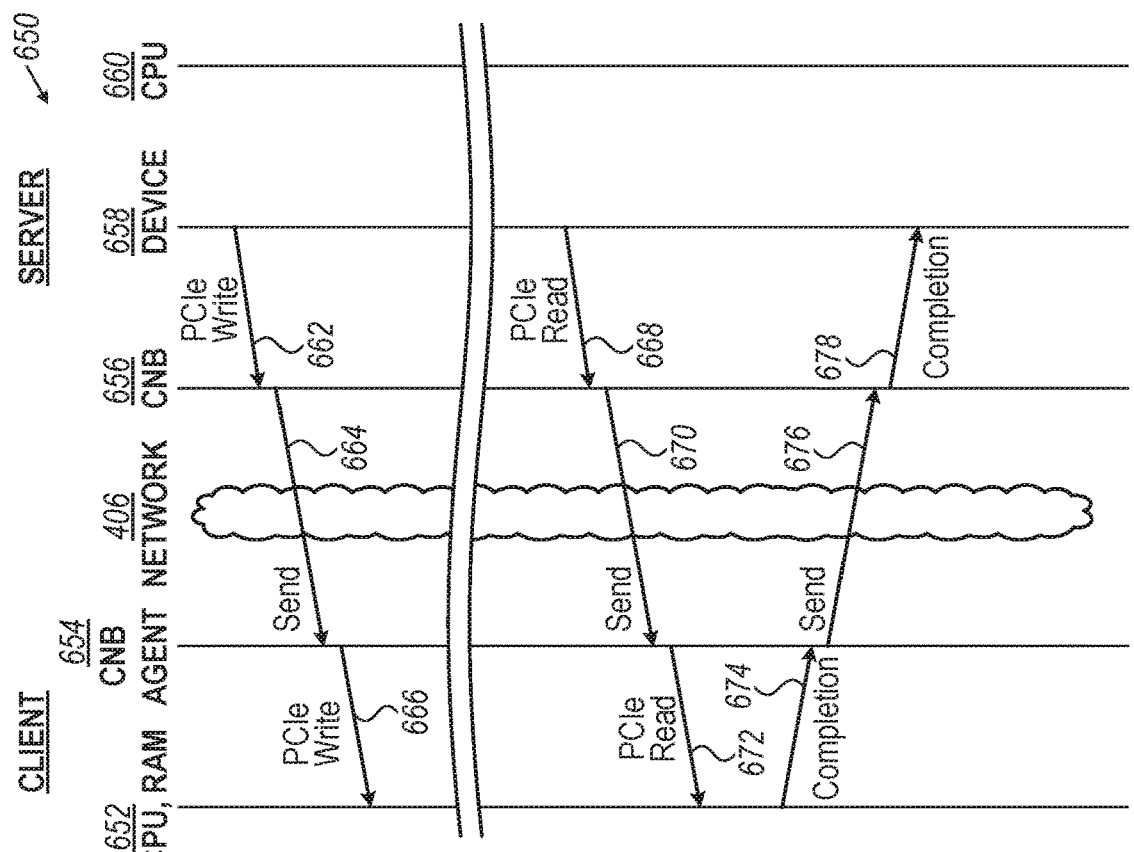
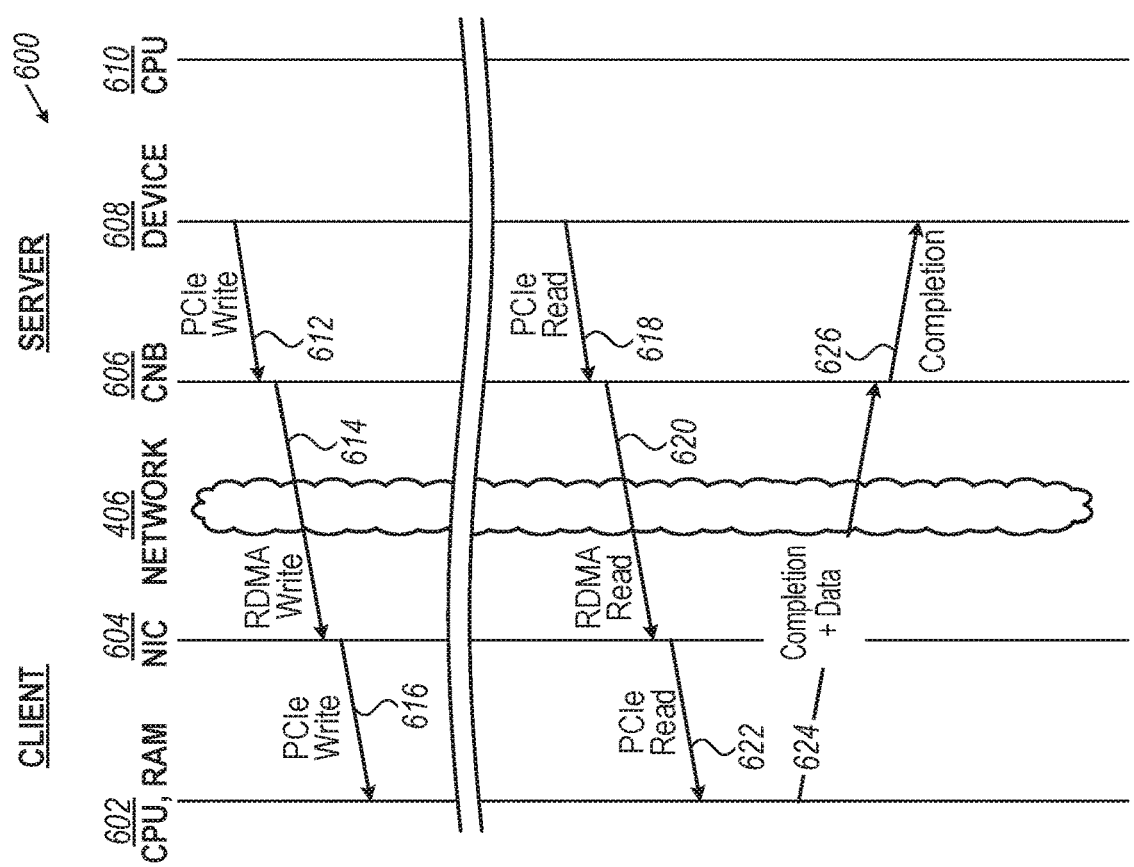
FIG. 6B
FIG. 6A

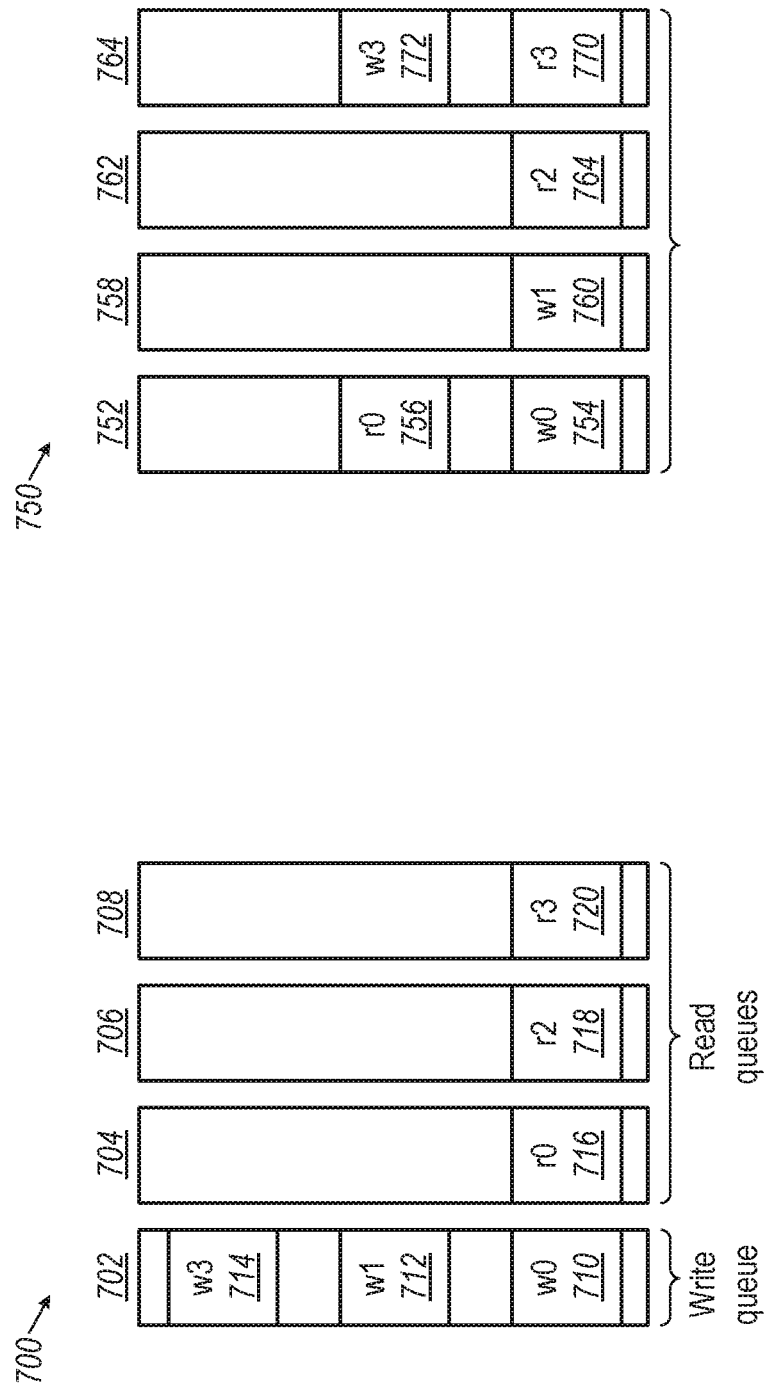

CROSS NETWORK BRIDGING

FIELD OF THE INVENTION

The present invention relates generally to cloud computing over communication networks, and particularly to methods and systems for disaggregation of remote server resources in cloud computing over such networks.

BACKGROUND OF THE INVENTION

Cloud-computing providers may use device disaggregation to flexibly allocate the resources of the server to a plurality of remote clients.

In "Disaggregated Computing. An Evaluation of Current Trends for Datacentres," Meyer et al., Procedia Computer Science 108C (2017) 685-694, the authors assert that the next generation data centers will likely be based on the emerging paradigm of disaggregated function-blocks-as-a-unit departing from the current state of mainboard-as-a-unit. Multiple functional blocks or bricks such as compute, memory and peripheral will be spread through the entire system and interconnected together via one or multiple high-speed networks.

In "Scalable Resource Disaggregated Platform That Achieves Diverse and Various Computing Services," NEC Technical Journal, Vol. 9 No. 2, Special Issue on Future Cloud Platforms for ICT Systems, by Takashi et al., the authors describe the future accommodation of a wide range of services by cloud data centers, which will require the ability to simultaneously handle multiple demands for data storage, networks, numerical analysis, and image processing from various users, and introduce a Resource Disaggregated Platform that will make it possible to perform computation by allocating devices from a resource pool at the device level and to scale up individual performance and functionality.

SUMMARY OF THE INVENTION

An embodiment of the present invention that is described herein provides a cross-network bridging apparatus including a bus interface and bridging circuitry. The bus interface is configured for connecting to a system bus. The bridging circuitry is configured to translate between (i) system-bus transactions that are exchanged between one or more local devices that are coupled to the system bus and served by the system bus and one or more remote processors located across a network from the apparatus, and (ii) data units that convey the system-bus transactions, for transmitting and receiving as network packets over the network to and from the remote processors.

In an embodiment, one or more of the local devices includes a Graphics Processing Unit (GPU). In another embodiment, one or more of the local devices includes a storage device, and one or more of the network packets includes an NVMe-over-fabrics (NVMe-F) command.

In some embodiments, the data units are formatted as the network packets, and the bridging circuitry is configured to transmit and receive the network packets to and from a network adapter. In an embodiment, the bridging circuitry is configured to maintain a plurality of Queue Pairs (QPs), each QP assigned to a respective connection between a respective local system bus device and a respective remote processor, and to transmit and receive the network packets by scheduling the plurality of the QPs. In an example embodiment, the bridging circuitry is configured to maintain a plurality of work-queue elements that are queued in the QPs, wherein each work-queue element is configured to define one or more of the system-bus transactions.

In a disclosed embodiment, the bridging circuitry is configured to produce a data unit by coalescing two or more of the system-bus transactions in a single work-queue element. In another embodiment, the bridging circuitry is configured to write outbound data units to a memory for transmission as network packets over the network, and to read from the memory inbound data units that were received over the network as network packets. In yet another embodiment, in translating between the data units and the system-bus transactions, the bridging circuitry is configured to modify one or more attributes of one or more of the system-bus transactions.

In some embodiments, the system bus includes a peripheral component interconnect express (PCIe) bus. In an embodiment, the system-bus transactions include PCIe Transaction Layer Packets (TLPs). In other embodiments, the system bus includes a compute express link (CXL) bus or an Nvlink bus. In an example embodiment, the data units include layer-3 network packets. In another embodiment, the system-bus transactions include PCIe transactions, and the data units include Remote Direct Memory Access (RDMA) packets. In yet another embodiment, the system-bus transactions include PCIe transactions, and the data units are to be transmitted as SEND message packets.

In some embodiments, the bridging circuitry is configured to identify that one or more of the system-bus transactions comprise Message-Signaled-Interrupts (MSI-X), and in response to the identifying, to translate the system-bus transactions including the MSI-X into one or more RDMA Extended Reliable Connection (XRC) messages. In an embodiment, the bridging circuitry is configured to translate a given system-bus transaction only in response to identifying that the given system-bus transaction matches a predefined criterion. In an embodiment, the bridging circuitry is configured to translate a given system-bus transaction only in response to identifying that the given system-bus transaction is not exchanged with a local system-bus address.

In an embodiment, at least one of the local devices includes a physical device served by the system bus. In another embodiment, one or more of the local devices include virtualized devices assigned in the physical device. In some embodiments, in translating between the data units and the system-bus transactions, the bridging circuitry is configured to translate between network addresses appearing in the data units and corresponding device addresses appearing in the system-bus transactions.

There is additionally provided, in accordance with an embodiment of the present invention, a cross-network bridging apparatus including a bus interface and bridging circuitry. The bus interface is configures for connecting to a system bus. The bridging circuitry is configured to translate between (i) system-bus transactions that are exchanged between a local processor that is coupled to the system bus and served by the system bus and one or more remote devices located across a network from the apparatus, and (ii) data units that convey the system-bus transactions, for transmitting and receiving as network packets over the network to and from the remote devices.

In an embodiment, the data units are formatted as the network packets, and the bridging circuitry is configured to transmit and receive the network packets to and from a network adapter. In another embodiment, the bridging circuitry is configured to write outbound data units to a memory for transmission as network packets over the network, and to read from the memory inbound data units that were received over the network as network packets.

There is also provided, in accordance with an embodiment of the present invention, a remote system bus analysis apparatus, including a first computer, a Cross-Network Bridge (CNB), and a second computer. The first computer includes a system bus. The CNB is configured to translate system-bus transactions that are exchanged over the system bus into network packets, and to transmit the network packets over a network. The second computer is configured to receive the network packets from the CNB over the network, to extract the system-bus transactions, exchanged over the system bus of the first computer, from the received network packets, and to analyze the system-bus transactions.

In some embodiments, the system bus includes a peripheral component interconnect express (PCIe) bus.

There is also provided, in accordance with an embodiment of the present invention, a cross-network bridging method, including operating one or more local devices that are coupled to a system bus and served by the system bus. Using bridging circuitry, a translation is made between (i) system-bus transactions that are exchanged between the one or more local devices and one or more remote processors located across a network, and (ii) data units that convey the system-bus transactions, for transmitting and receiving as network packets over the network to and from the remote processors.

There is further provided, in accordance with an embodiment of the present invention, a cross-network bridging method, including operating a local processor that is coupled to a system bus and served by the system bus. Using bridging circuitry, a translation is made between (i) system-bus transactions that are exchanged between the local processor and one or more remote devices located across a network, and (ii) data units that convey the system-bus transactions, for transmitting and receiving as network packets over the network to and from the remote devices.

There is further provided, in accordance with an embodiment of the present invention, a remote system bus analysis method, including, using a Cross-Network Bridge (CNB), translating system-bus transactions that are exchanged over a system bus of a first computer into network packets, and transmitting the network packets over a network. In a second computer, the network packets are received from the CNB over the network, the system-bus transactions, which are exchanged over the system bus of the first computer, are extracted from the received network packets, and the system-bus transactions are analyzed.

The present invention will be more fully understood from the following detailed description of the embodiments thereof, taken together with the drawings in which:

BRIEF DESCRIPTION OF THE DRAWINGS

FIG. 4 is a sequence diagram that schematically illustrates communication with a remote computer in a Full-Tunneling-SEND-Protocol communication mode, in accordance with an embodiment of the present invention;

FIG. 5 is a sequence diagram that schematically illustrates communication with a remote computer in a Full-Tunneling-Mixed-Protocol communication mode, in accordance with an embodiment of the present invention;

FIG. 6A is a sequence diagram that schematically illustrates server-initiated communication with a remote client in a Single-End-Tunneling-RDMA-Protocol communication mode, in accordance with an embodiment of the present invention;

FIG. 6B is a sequence diagram that schematically illustrates server-initiated communication with a remote client in a Single-End-Tunneling-SEND-Protocol communication mode, in accordance with an embodiment of the present invention;

FIG. 7A is a block diagram that schematically illustrates PCIe tunneling with multiple concurrent queues, adhering to PCIe ordering rules, in accordance with an embodiment of the present invention;

FIG. 7B is a block diagram that schematically illustrates PCIe tunneling with multiple concurrent queues, adhering to same-cache-line ordering rules, in accordance with an embodiment of the present invention;

DETAILED DESCRIPTION OF EMBODIMENTS

Overview

Figure 1:
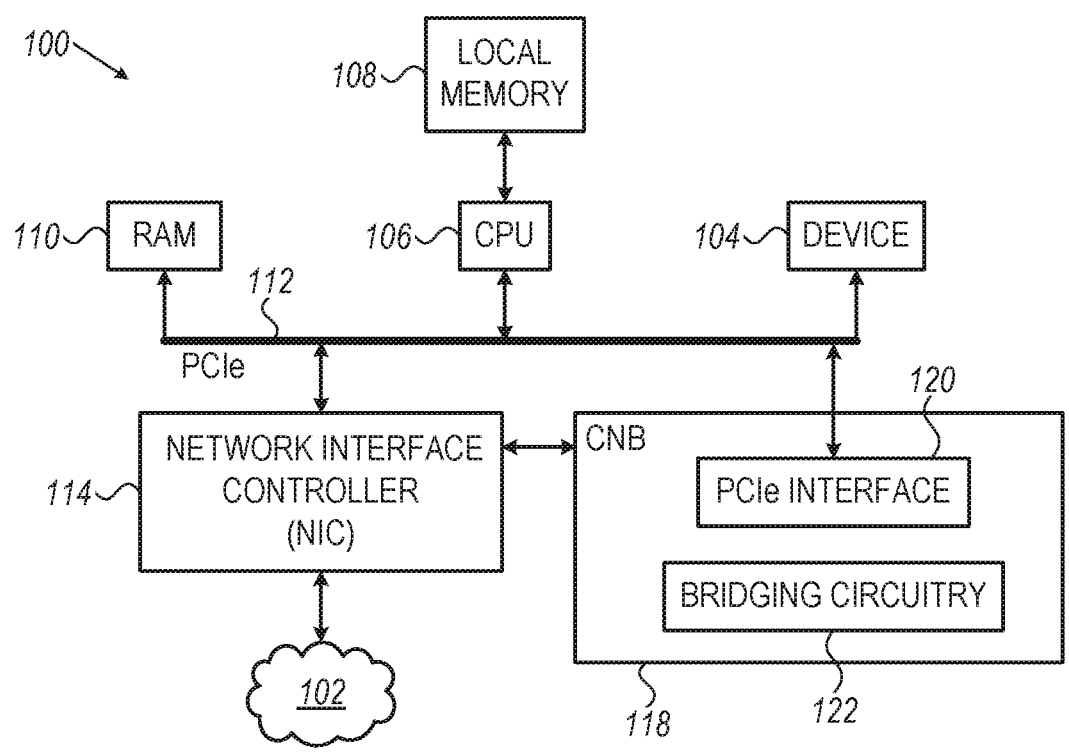
FIG. 1 is a block diagram that schematically illustrates the architecture of a server, in accordance with an embodiment of the present invention.

Device disaggregation allows a compute server, which comprises computing devices such as Solid-State Disks (SSD) or Graphics Processing Units (GPU), to share the devices or parts thereof between a plurality of remote clients. Computing devices in servers, which may be disaggregated and shared by remote clients, will referred to hereinbelow as "devices" for brevity.

Embodiments according to the present invention provide apparatus and methods for efficient device disaggregation, with low CPU overhead, low storage requirements and good response time, typically using standard networks and standard network protocols.

In embodiments, devices may be coupled to a Peripheral Component Interconnect Express (PCIe) bus, and communicate with remote clients by way of Transactions Layer Packets (TLPs) that the device exchanges over the PCIe; the TLPs are tunneled between the device and the client, over the network, transparently to the device (and, in some embodiments, transparently to the client).

Although the embodiments hereinbelow refer mainly to PCIe and PCIe TLPs, other system buses and bus protocols may be used in alternative embodiments; for example, in some embodiments, Compute Express Link (CXL) or Nvlink may be used.

In some embodiments, a server may comprise a Cross-Network-Bridge (CNB), which monitors TLPs over the PCIe bus, determines if the TLPs are destined to a remote client, and, if so, sends a corresponding message over the network to the destined client. In an embodiment, the CNB further receives network messages destined to the device and generates corresponding TLPs on the PCIe.

In some embodiments, Two-Way-Tunneling may be used, wherein both the server and a peer client comprise CNBs; in other embodiments, Single-End-Tunneling is used, wherein only the server comprises a CNB, and client-initiated communication is done by other means (such means will be described hereinbelow).

In embodiments, devices of the server may be disaggregated to virtual functions, which could be allocated simultaneously to a plurality of clients. In some embodiments, a single client may simultaneously access virtual functions in more than one server.

In an embodiment, the CNB translates TLPs into Remote-Direct-Memory Access (RDMA) read and/or write messages, and transfers the messages using RDMA over network protocol such as Infiniband or RDMA over Converged Ethernet (RoCE) technology (for RoCE background, see, for example, "RoCE Rocks without PFC: Detailed Evaluation," Shpiner et al. Proceedings of the Workshop on Kernel-Bypass Networks 2017, pages 25-30 (doi:10.1145/3098583.3098588)). In another embodiment, the CNB translates TLPs into RDMA Send messages (will be referred to hereinbelow, for brevity as SEND messages).

In the foregoing, five example communication modes and corresponding server and client configurations will be described:
Full-Tunneling-SEND-Protocol mode;
Full-Tunneling-Mixed-Protocol mode;
Single-End-Tunneling-RDMA-Protocol mode;
Single-End-Tunneling-SEND-Protocol mode; and
Hybrid mode In embodiments, both server and client maintain Queue-Pairs (QPs) to handle network messages that correspond to the TLPs. In an embodiment, the QPs comprise one or more work-queues to store work-queue-elements (WQEs), pertaining to network packets that are scheduled to be communicated over the network; for each work-queue there may be a corresponding completion queue, which stores completion-queue-elements (CQEs), corresponding to WQEs in the work-queue.

In some embodiments, the CNB is configured to maintain read and write work queues and to post WQEs from the work queues (for execution by the NIC) in an order that adheres to PCIe ordering discipline. In other embodiments, the CNB is configured to post the WQEs in an order that adheres to same-cache-line ordering discipline.

According to some embodiments, when translating TLPs into network messages, the CNB is configured to improve performance by coalescing a plurality of messages. In SEND-Protocol communication modes, the CNB is configured to tunnel multiple TLPs in each SEND operation. In the RDMA-protocol communication modes, for an RDMA-READ or RDMA-WRITE, the CNB is configured to coalesce a sequence of TLPs that target neighboring address ranges to a single message that corresponds to a contiguous PCIe address space. As will be described below, coalescing may also be limited if it could violate the ordering rules.

In various embodiments, TLP tunneling includes the tunneling of Message-Based-Interrupt-Extended (MSI-X) packets from a computer (server or client) to a single or to multiple peers (or to multiple destinations within a peer).

In an embodiment, CNBs may comprise matching registers that store comparison data for TLP headers, including "don't care" fields. The matching registers may also comprise routing information for matched TLPs. When TLPs transverse the PCIe bus, the CNB compares the TLP headers to the comparison data; if a match is found, the CNB may tunnel the TLP, according to the TLP header and to the routing information stored in the corresponding match register, to a QP, which will send a communication message over the network to the peer.

In some embodiments tunneling a write TLP comprises: a) comparing the TLP header to data stored in the match registers; b) determining that the TLP should be tunneled; c) setting a flow ID for the corresponding network packets; d) sending a WQE for execution; and, e) receiving a CQE that signals the completion of the WQE execution.

In embodiments, tunneling a read TLP is similar to tunneling a write TLP, except that, following d), the network will accept a response message from the peer, and send the CQE after the response packet is received.

According to embodiments, when the CNB changes fields of a tunneled TLP (such as requestor ID or TAG, the CNB modifies the ECEC field of the TLP accordingly. In an embodiment, the ECRC is incrementally modified.

The communication protocols that are used comprise, for example, RDMA send, RDMA write and RDMA Read. In other embodiments the protocol may comprise Non-Volatile-Memory express over Fabrics (NVMe-F). Further additionally or alternatively, any other suitable protocol may be used.

Another embodiment of the present invention provides a system for remote PCIe analysis, comprising a first computer with PCIe and a CNB that is coupled to a network. A second computer that is coupled to the network can remotely analyze PCIe transactions in the first computer, wherein the CNB of the first computer nay be configured to tunnel PCIe transactions to the second computer, for analysis. In some embodiments the analysis software runs on the second computer and may have an agent that runs in the first computer.

In summary, according to embodiments of the present invention, device disaggregation is provided by a CNB that tunnels PCIe TLPs to a peer computer using standard communication protocols and injects TLPs into a PCIe bus in response to receiving messages over the network from the peer computer. The CNB may also be used for remote PCIe diagnostics.

The disclosed techniques can be used in a wide variety of use-cases and environments. In some use-cases, one or more of the disaggregated devices comprise GPUs. In other use-cases, the disclosed CNB may be used in a storage application, e.g., using protocols such as NVMe-F.

In the embodiments described below the clients comprise CPUs, but this choice is made purely for by way of example. In other embodiments, the disclosed techniques can be used for bridging between devices and any other type of clients, and in particular various processors such as GPUs. The term "processor" is thus used herein to refer to CPUs, GPUs and other suitable processor types.

System Description

In the descriptions hereinbelow we will use the terms "server" and "client"; while other definitions of clients and server may exist, for our purposes, a client is a computer hardware device or software that accesses, over a communication network, a service made available by a server, and a server is a computer dedicated to run services to serve the needs of other computers.

Although the embodiments described hereinbelow refer to servers and clients that comprise PCIe system buses, other suitable system buses may be used in alternative embodiments, including, for example, Compute Express Link (CXL) or Nvlink.

FIG. 1 is a block diagram that schematically illustrates the architecture of a server 100, in accordance with an embodiment of the present invention. Server 100 is coupled to a network 102, such as Ethernet or InfiniBand-(or any other suitable communication network), and is configured to allow clients (not shown) that are connected to the network, to access a device 104. Device 104 serves as an example for devices that can be disaggregated according to the disclosed embodiments. Such devices may include (but are not limited to) a Solid-State Disk (SSD) or a Graphics Processing Unit (GPU), Field Programmable Gate Arrays (FPGAs) and deep-learning inference engines.

According to embodiments of the present inventions, circuitry and suitable software disaggregate the device and expose it to clients that are coupled to the network.

Server 100 further comprises a CPU 106, a CPU local memory 108 (that stores local CPU data and instructions), and a Random-Access Memory (RAM) 110. CPU 106, Device 104 and RAM 110 are coupled to a Peripheral Component Interconnect Express (PCIe) high-speed system bus 112 (other suitable high-speed system buses may be used in alternative embodiments).

CPU 106 transverses communication packets over Network 102 through PCIe bus 112 and a Network Interface Controller (NIC) 114. (Although NIC is an ethernet term, other types of network adapters may be used in alternative embodiments, such as InfiniBand Host Channel Adapter (HCA), or any other suitable network adapter.)

To allow client processors coupled to network 102 to receive service from device 104, server 100 further comprises a Cross-Network Bridge (CNB) 118. According to the example embodiment illustrated in FIG. 1, CNB 118 is configured to translate between PCIe Transaction Layer Packets (TLPs) and corresponding network packets, transparently to CPU 106 (TLPs comprise one or more PCIe transactions over the PCIe bus).

In some embodiments, CNB 118 comprises a bus interface, in the present example a PCIe interface 120, for connecting to PCIe bus 112, and bridging circuitry 122 that is configured to perform the various CNB functions. The various CNBs described herein may also have this general structure. In some embodiments, although not necessarily, CNB 118 comprises an additional interface for communication directly with NIC 114. In the description that follows (of FIG. 1 and subsequent figures), actions performed by the bridging circuitry are referred to as being performed by the CNB, for brevity.

When the server receives from a client a packet that is destined to device 104, directly or through RAM 110, the CNB receives the packet from NIC 114, and generates a corresponding PCIe TLP that writes data in the device and/or the RAM. When device 104 initiates communication with a client, the device generates TLPs over the PCIe; the CNB intercepts the TLPs, translates the TLPs to communication packets, and sends the packets, through NIC 114 to the network. (The translation between packets and TLPs will sometimes be referred to as Tunneling.)

Thus, according to the example embodiment of FIG. 1, device 104 is disaggregated and exposed to clients; remote clients can communicate with the device transparently to the server CPU, using TLPs; the CNB bridges between packets transversed between a client and the device to TLPs, transparently to the CPU.

As would be appreciated, the configuration of server 100 illustrated in FIG. 1 is an example configuration that is depicted purely for the sake of conceptual clarity. Other suitable configurations may be used in alternative embodiments of the present invention. For example, CPU 106 may comprise multiple CPUs; PCIe bus 112 may be any other suitable bus; local memory 108 may be omitted, RAM 110 may be omitted. In some embodiments, there may be a hierarchy of local memories and/or of RAMs; in other embodiments, there may be a plurality of high-speed system buses and a plurality of devices.

According to some embodiments of the present invention, client computers may also comprise a Cross-Network-Bridge, similar or identical to CNB 118 (FIG. 1).

Figure 2:
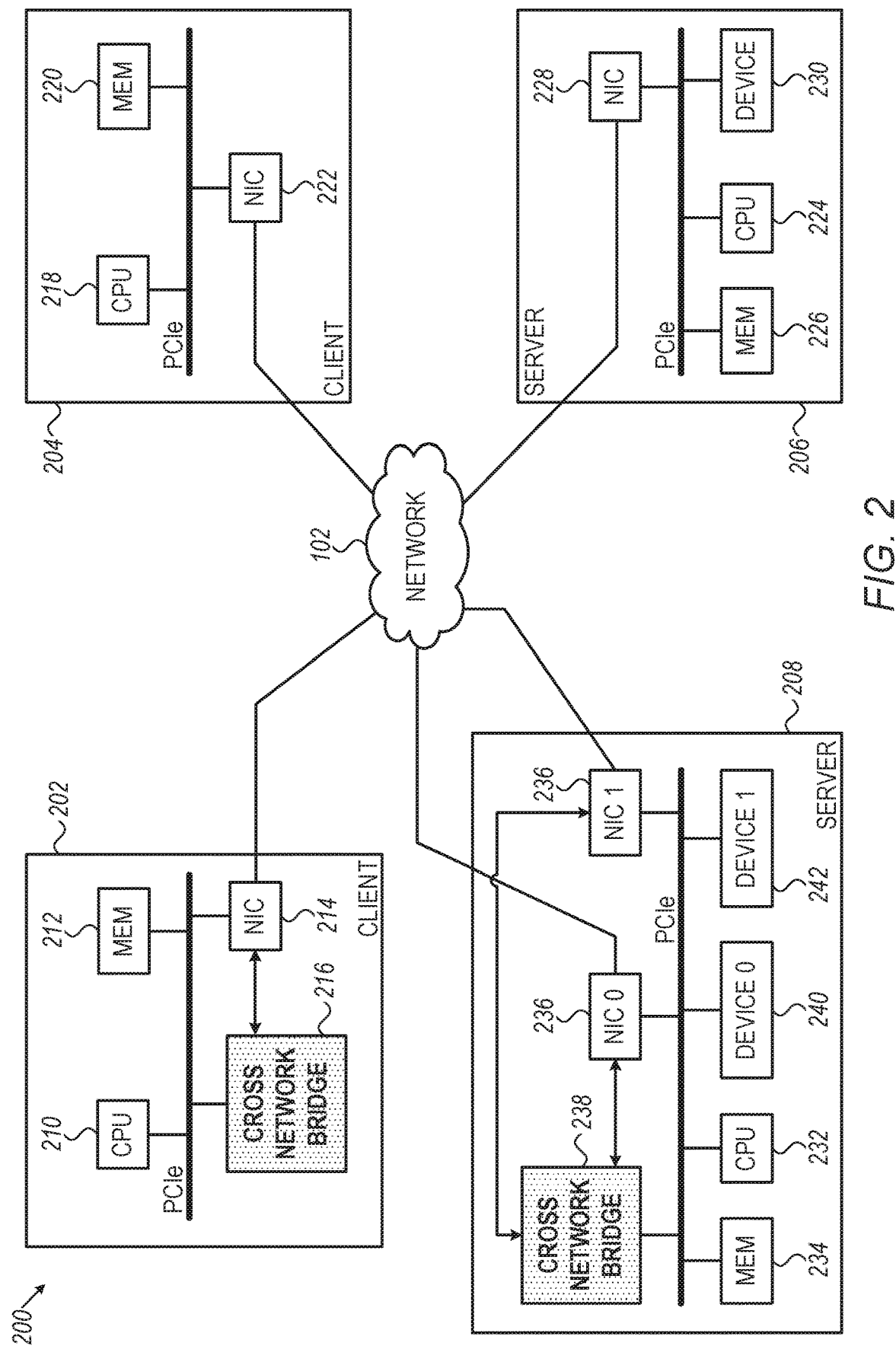
FIG. 2 is a block diagram that schematically illustrates a network, comprising clients and servers, in accordance with an embodiment of the present invention.

FIG. 2 is a block diagram that schematically illustrates a Network 200, comprising clients and servers, in accordance with an embodiment of the present invention. Network 200 comprises a packet switching network 102 (FIG. 1), which may be Ethernet, InfiniBand- or any other suitable network, and four computer that communicate over the network: a first client 202, a second client 204, a first server 206 and a second server 208. As would be appreciated, additional computers may be coupled to network 102, including (but not limited to) additional servers and additional clients.

Client 202 comprises a CPU 210, a Memory 212, a Network Interface Controller NIC 214 and a Cross Network Bridge (CNB) 216. According to the example embodiment illustrated in FIG. 2, all client's 202 subunits mentioned above are interconnected by a system bus (e.g., PCIe).

When communicating with servers (e.g., server 206 or server 208) that are coupled to network 102, CPU 210 may send data to a device in a remote server, using TLPs. CNB 216 is configured to intercept such TLPs, and convert the TLPs to network packets, using, for example, full RDMA protocol or the SEND part of an RDMA protocol (to be described below), transparently to the CPU; NIC 214 then sends the packets to the remote server.

CNB 216 is further configured to receive packets destined to memory 212 from a device in a remote server, convert the input data to TLPs and directly write the data into memory 212.

Client 204 comprises a CPU 218, a Memory 220 and a NIC 222. Client 204 does not comprise a CNB, and, hence, to access devices in servers 206 or 208, client 204 may use techniques such as RDMA. Client 204 is oblivious to the implementation of the remote server and, particularly, to whether the remote server comprises a CNB.

Server 206 comprises a CPU 224, a Memory 226, a NIC 228 and a Device 230, interconnected by a PCIe system bus. Like server 100 (FIG. 1), server 206 supports tunneling and directly translates between network packets and TLPs. Server 206 is oblivious to the implementation of the remote client and, particularly, to whether the remote client comprises a CNB.

Server 208 is an example of a more complex server, comprising a CPU 232, a memory 234, two NICs 236, a CNB 238 and two devices—a Device-0 240 and a device-1 242. The two devices may be of the same or of different types; the two NICs may communicate packets concurrently, increasing the communication bandwidth. CNB 238 is coupled to the two NICs, and translates between packets traversing through either NIC and corresponding TLPs.

Thus, according to the example configuration illustrated in FIG. 2, various clients and servers may communicate with each other over the network, including servers and clients with or without CNB. The devices in the server are disaggregated and exposed to the clients. The addition of a CNB to a client or a server is transparent to the software. Moreover, the addition of a CNB to a server is transparent to the served clients, and the addition of a CNB to a client is transparent to the serving servers.

As would be appreciated, the configuration of network 200, including clients 202, 204 and servers 206, 208 are example configurations that are depicted purely for the sake of conceptual clarity. Other suitable configurations may be used in alternative embodiments of the present invention. For example, in some embodiments, some servers may also double function as clients and some clients may access servers through other network elements; in other embodiments some servers and/or clients may comprise a plurality of PCIe buses and in yet other embodiments some servers and/or clients may be an aggregation of a plurality of coupled computers.

Figure 3:
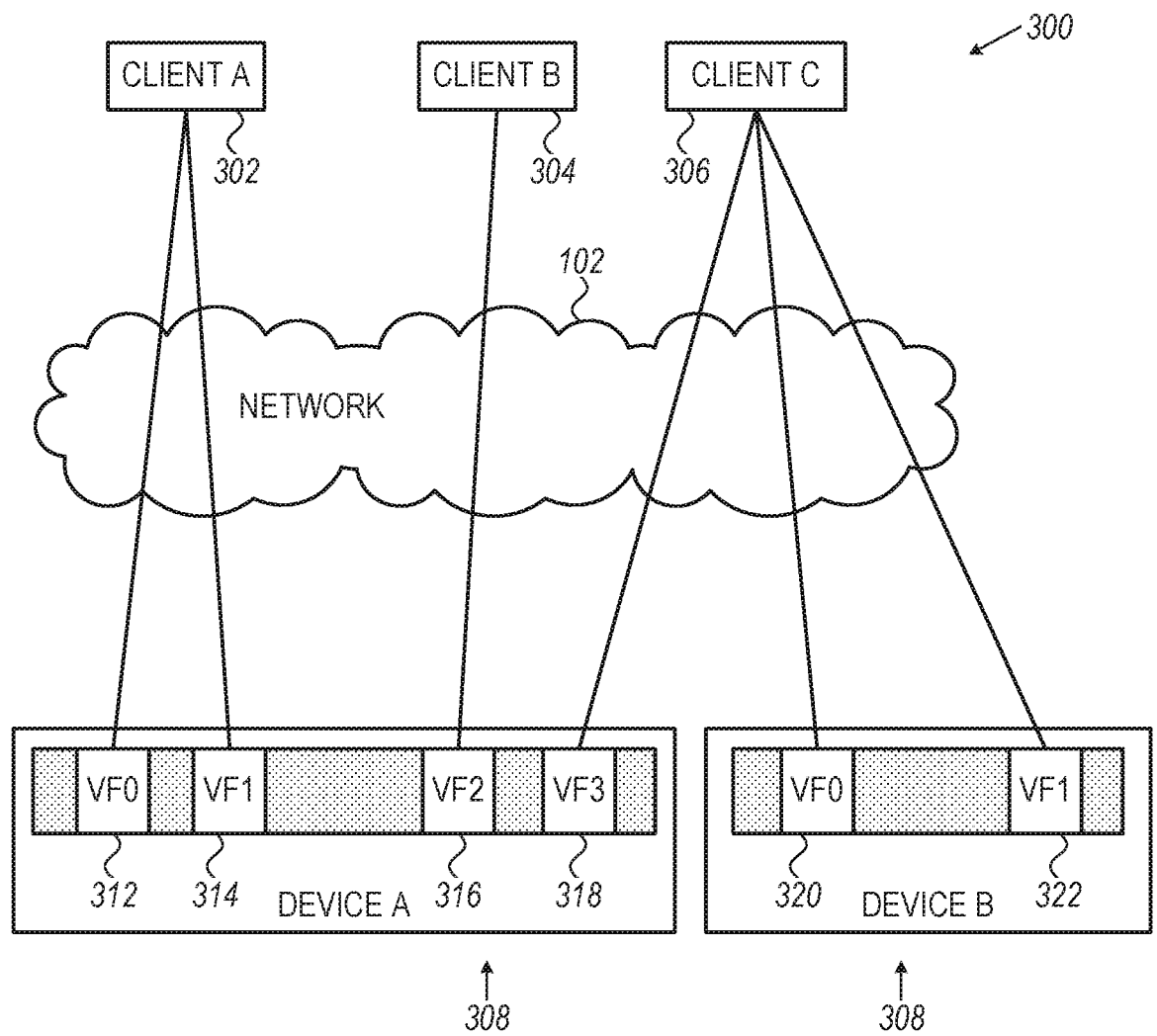
FIG. 3 is a block diagram that schematically illustrates the allocation of virtual functions of devices to client Central Processing Units (CPUs), in accordance with an embodiment of the present invention.

FIG. 3 is a block diagram 300 that schematically illustrates the allocation of virtual functions of devices to client CPUs, in accordance with an embodiment of the present invention. In example embodiments, devices may comprise storage devices (e.g., SSDs) or GPUs, and virtual functions may comprise virtual storage or processing functions.

Three clients are shown—a client A 302, a client B 304 and a client C 306. The clients are connected through a network 102 (FIGS. 1 and 2) to two devices—a device A 308 and a device B 310. In some embodiments, the two devices may be in two separate servers; in other embodiments the two devices may be in the same server.

According to the example embodiment illustrated in FIG. 3, each of the two devices is divided to a plurality of virtual functions (VFs) which are concurrently mapped to requesting entities (e.g., Virtual Machines (VMs)) in the clients—device A 308 is divided to a VF0 312, a VF1 314, a VF2 316 and a VF3 318, whereas device B 310 is divided to a VF0 320 and a VF1 322. The VFs may be identified either by the addresses that the client CPU specifies when accessing the device, or by a Requestor-ID or a PASID that the VF adds to the network transmission, in device to client TLPs.

According to the example embodiment illustrated in FIG. 3, each of VF0 312 and VF1 314 is accessed by client A 302 with a different address range; client A can distinguish between VF0 312 and VF1 314 accesses since they comprise a different requestor-ID or PASID fields (completions indications from client A back to device A will comprise the same requestor-ID field). Further, according to the example embodiment of FIG. 3, client B 304 is allocated a single VF—VF2 316, whereas client C 306 is allocated three VFs—VF3 318 of device A 308, VF0 320 and VF1 322 of device B 310.

On the server side, different clients served by the same device may be distinguished based on a unique requester-ID, a PCIe's process address space identifier (PASID), or, if the server comprises an input-output memory management unit (IOMMU), based on the address-range.

It should be noted that not all requestor-IDs need to be tunneled; some functions may be handled by local CPUs, with no CNB intervention.

As would be appreciated, the configuration illustrated in FIG. 3 is an example configuration that is depicted purely for the sake of conceptual clarity. Other suitable configurations may be used in alternative embodiments of the present invention. For example, some of the server-client communications may be done over private networks and some of the servers may double-function as clients.

Communication Modes

According to embodiments of the present invention, when connecting clients to servers, at least five different client-server communication modes can be used, as summarized in the table below ("acked" is short for "acknowledged")

| Comm. Mode | Full tunneling SEND protocol | Full tunneling mixed protocol | Single-End tunneling RDMA protocol | Single-End tunneling SEND protocol | Hybrid |
|---|---|---|---|---|---|
| Server-side CNB | yes | yes | yes | yes | yes |
| Client-side CNB | yes (unless software emulation is used) | Yes (not involved in write-PCIe injection) | no | CNB agent | No |
| CPU → device write protocol | SEND | RDMA-write | Not covered | Not covered | Not covered |
| CPU → device read protocol | SEND, acked by completion SEND | SEND, acked by completion SEND | Not covered | Not covered | Not covered |
| Device → CPU write protocol | SEND | SEND | RDMA Write | SEND | RDMA Write |
| Device → CPU read protocol | SEND, acked by completion SEND | SEND, acked by completion SEND | RDMA Read, acked by RDMA Read response | SEND, acked by completion SEND | RDMA Read, acked by RDMA Read response |
| PCIe address translation | Fixed | Fixed | Fixed | Fixed | Reconfigured in each TLP |

Other suitable modes, including but not limited to combinations of the modes herein, may be used in alternative embodiments; form example, in an embodiment, only the client has a CNB.

In some of the communication modes, the client CPU may not need a CNB, and any suitable client CPU may be used, as will be described hereinbelow.

Full Tunneling, Send-Protocol

According to embodiments of the present invention, a Full-Tunneling-SEND-Protocol communication mode may be set, wherein both the client and the server comprise a CNB, and TLPs in both client and server are tunneled to the peer computer by SEND messages that transverse over the network (SEND is a part of the RDMA protocol).

FIG. 4 is a sequence diagram 400 that schematically illustrates communication with a remote computer in a Full-Tunneling-SEND-Protocol communication mode, in accordance with an embodiment of the present invention. As the sequence in the Full-Tunneling-SEND-Protocol communication mode is symmetric (with respect to client-server), FIG. 4 refers to an Initiator (or "Requestor"), comprising a CPU/Device/RAM and a CNB; and a Responder (or "Target"), comprising a CPU/Device/RAM and a CNB. Either the initiator or the responder can be the client or the server.

A CPU/Device/RAM is an aggregation of PCIe-coupled circuits in the client or the server; typically, the client side does not include a device; and, in some embodiments, either side may not include a PCIe memory. For brevity, we will refer below to the CPU/RAM/Device aggregation as a CPU-Complex.

FIG. 4 illustrates interaction events between the following objects: an initiator-side CPU-Complex 402, an initiator-side CNB 404, a communication network 406, a responder-side CNB 408, and a responder-side CPU-Complex 410. (CNB operations as illustrated in FIG. 4 include operations that are controlled by the CNB but executed by other parts of the NIC.) FIG. 4 depicts a Write (initiator to responder) flow, followed by a Read flow.

The first (from top) three events depict an initiator-to-responder Write. The sequence starts with a PCIe Write event 412, wherein the initiator's CPU executes a write TLP. The initiator-side CNB intercepts the TLP, and, according to the address range or to a requestor ID, (or PASID) determines that the TLP should be tunneled to the responder (to a remote device for a server, or to memory for a client), encapsulates the data from the TLP in a SEND message, and, in a SEND event 414, sends the SEND message over Network 406 to the responder side CNB 408. The responder-side CNB then, in a Write-PCIe event 416, generates a TLP corresponding to the initiator side TLP (of event 412); the CNB may correct addresses relative to the responder's PCIe Base-Address Register (BAR), so as to point to the address range dedicated to the responder.

The next six events depict an initiator-to-responder Read. At a PCIe Read event 418, the initiator's CPU generates a read-TLP, from an address range that is associated with the responder (memory or device). Initiator-side CNB 404 intercepts the TLP and interprets the TLP as a read request. The CNB then, in a SEND event 420, sends a SEND message corresponding to the read request through network 406 to the responder side CNB 408. Responder-side (or requestor-side) CNB 408 may change the addresses (or requestor ID) according to the responder PCIE BAR and, in a PCIe Read event 422, generates a read-TLP that corresponds to the read TLP in the initiator PCIe.

CPU-complex 410 receives the PCIe-Read event and, in a Completion event 424, responds by generating a TLP corresponding to a completion transaction, as if responding to a read request originated by a CPU coupled to the same PCIe. The TLP is intercepted by responder side CNB 408, which, in a SEND event 426, sends a SEND message that encapsulates the completion TLP, over network 406. The initiator-side CNB receives the SEND message and, in a completion event 428, generates a completion TLP that corresponds to the responder-side PCIe completion TLP of event 424.

In summary, the example embodiment illustrated in FIG. 4 describes full tunneling with Send communication mode, wherein:
  both client and server comprise a CLB.
  The CLBs capture TLPs and encapsulate the TLPs in SEND messages that are sent across the network.
  The remote CNB, responsive to the SEND messages, injects TLPs, and may modify (in the client side) the PCIe requestor-ID to the expected local requestor-ID, or (in the server side), the addresses, respective to the device (or virtual device) offset from the BAR in the remote PCIe.
  In Read TLPs, the initiator CLB stores the read request tag, and sends a corresponding SEND message; the responder generates a Response SEND packet, and send it to the initiator; the initiator then tunnels the response to the local PCIe.

Full Tunneling, Mixed Protocol

According to embodiments of the present invention, a full-tunneling-Mixed-protocol communication mode may be set between a server and a client, wherein both the client and the server comprise a CNB. TLPs in both the client and the server are tunneled to the peer, using SEND messages when writing to the device, and using RDMA protocol when writing to the client memory.

FIG. 5 is a sequence diagram 500 that schematically illustrates communication with a remote computer in a full-tunneling-Mixed-Protocol communication mode, in accordance with an embodiment of the present invention. As the sequence in the full-tunneling mixed-protocol mode is symmetric (with respect to client-server), FIG. 5, like FIG. 4 above, refers to an Initiator and a Responder, both comprising CPU-RAM-Devices ("CPU-Complexes")—an initiator side CPU-Complex 502 and a responder side CPU-Complex 510. The initiator side further comprises a CNB 504, and the responder side further comprises a CNB 508.

FIG. 5 depicts a Write flow, followed by a Read flow. The first (from top) three events depict an initiator to responder Write and may be identical to the first three events illustrated in FIG. 4A. The sequence starts with a PCIe Write event 512, wherein the initiator's CPU-Complex executes a write TLP on the PCIe. The initiator's CNB intercepts the TLP, determines that the TLP should be tunneled to a responder, encapsulates the data from the TLP in an RDMA-Write message, and, in a RMA-Write event 514, sends the RDMA-Write message over Network 406 to the responder-side CNB 508. The responder-side CNB then, in a Write-PCIe event 516, generates a TLP corresponding to the initiator-side TLP (of event 512).

The next six events depict an initiator-to-responder Read. At a PCIe Read event 518, the initiator's CPU-complex generates a Read-TLP, from an address range that is associated with the responder. Initiator-side CNB 504 intercepts the TLP and interprets it as a remote read request; the initiator's CPU-Complex also stores a tag ID for the read TLP. Next, in a SEND event 520, the initiator-side CNB sends a SEND message corresponding to the read request through network 406 to the responder side CNB 508, which, in a PCIe Read event 522, generates a read TLP that corresponds to the read TLP in the initiator's PCIe (event 518).

Responder-side CPU-complex 510 receives the PCIe-Read event and, in a Completion event 524, responds by generating a completion TLP, as if responding to a read request originated by a CPU coupled to the same PCIe. The TLP is intercepted by responder side CNB 508, which sends, in an SEND event 526, a SEND message that encapsulates the returned data from the TLP, over network 406. The RDMA-Write protocol bypasses the initiator-side CNB, and is handled by the initiator's CPU-complex, which may generate a corresponding TLP to write the input data in the local RAM (the initiator's CPU also compares the tag with the stored tag, to handle out-of-order return packets).

Single-End-Tunneling RDMA-Protocol

According to further embodiments of the present invention, a Single-End-Tunneling-RDMA-protocol communication mode may be set between a server and a client, wherein only the server comprises a CNB; thus, in embodiments, a server may serve clients that do not comprise CNBs. Moreover, in embodiments, the server is oblivious to the configuration of the peer client, which may or may not include a CNB.

FIG. 6A is a sequence diagram 600 that schematically illustrates server-initiated communication with a remote client in a Single-End-Tunneling-RDMA-Protocol communication mode, in accordance with an embodiment of the present invention.

FIG. 6A illustrates interaction events between client-side CPU/RAM 602, client-side NIC 604, communication network 406, a server-side CNB 606, a server-side device 608 and a server-side CPU 610. FIG. 6A depicts a Write (server to client) sequence, followed by a Read sequence.

The first (from top) three events depict a server-to-client Write. The sequence starts with a PCIe Write event 612, wherein the server's device generates a write TLP. The server-side CNB 606 intercepts the TLP, determines that the TLP should be tunneled to a remote client (e.g., based on the address range), encapsulates the data from the TLP in an RDMA-Write message, and, in an RDMA-Write event 614, sends the RDMA-Write message over Network 406 to the client side CNB 604. The client-side CNB then, in a PCIe-Write event 616, generates a TLP corresponding to the server side TLP (of event 612).

The next eight events depict a server-to-client Read. At a PCIe Read event 618, the server's device generates a read TLP from an address range that is associated with the remote client. Server-side CNB 606 intercepts the TLP and interprets it as a read request from a client. The CNB stores a tag ID for the read TLP and, in an RDMA-Read event 620, sends an RDMA-READ message corresponding to the read request through network 406 to the client side NIC 604, which, in a PCIe Read event 622, generate a read TLP that corresponds to the PCIe read TLP in the server PCIe (event 618).

Client CPU 602 receives the TLP-Read message and, in an Completion+Data event 624, responds by a completion indication and the returned data, in a message to the server over the network. The message is received by the server-side CNB 606, which. In a Completion event 626, generates completes the transaction.

Thus, according to the example embodiment illustrated in FIG. 6A, a server with a CNB can communicate with a client that does not comprise a CNB; the communication is CPU-transparent at the server side.

Single-End-Tunneling Send-Protocol

According to embodiments of the present invention, a Single-End-Tunneling-SEND-Protocol communication mode may be set between a server and a client, wherein the server comprises a CNB and the client comprises a reduced-functionality CNB-agent (which may be implemented by software).

FIG. 6B is a sequence diagram 650 that schematically illustrates server-initiated communication with a remote client in a Single-End-Tunneling-SEND-Protocol communication mode, in accordance with an embodiment of the present invention. FIG. 6B illustrates interaction events between a client-side CPU/RAM 652, a client-side CNB agent 654, communication network 406, a server-side CNB 656, a server-side device 658 and a server-side CPU 660. FIG. 6B depicts a Write (server to client) flow, followed by a Read flow and by a tunneling-complete signaling.

The first (from top) three events depict a server-to-client Write. The sequence starts with a PCIe Write event 662, wherein the server's device generates a write TLP on the PCIe. The server-side CNB intercepts the TLP, determines that the TLP should be tunneled to a remote client (e.g., based on the address range), encapsulates the data from the TLP in a SEND message, and, in a SEND event 664, sends the SEND message over Network 406 to client side CNB-agent 654. CNB agent 654 will then, in a Write-PCIe event 666, generate a TLP corresponding to the server side TLP (of event 662).

The next eight events depict a server-to-client Read. At a PCIe Read event 668, the server's device generates a TLP from an address range that is associated with the remote client. Server-side CNB 656 intercepts the TLP and interprets it as a read request. The CNB stores a tag ID for the read TLP and, in a SEND event 670, sends a SEND message corresponding to the read request through network 406 to client side CNB-agent 654, which, in a PCIe Read event 672, generates a read TLP that corresponds to the read TLP in the server PCIe (event 668).

Client's CPU/RAM 652 receives the SEND message and, in a Completion event 674, responds by generating a completion TLP, as if responding to a read request originated by a device coupled to the same PCIe. The TLP is intercepted by client side CNB-agent 654, which sends, in a SEND event 676, a SEND message that encapsulates the completion TLP, over network 406. The server-side CNB receives the message, compares and generates a completion TLP that corresponds to the client-side PCIe completion write event 674.

Hybrid Communication Mode

In yet other embodiments of the present invention, a Hybrid communication mode may be set between a server and a client, wherein the server only comprises a CNB.

The Hybrid communication mode is like Single-End-Tunneling RDMA-Protocol, except that instead of full device pass through (entire device is controlled by the remote client)—the device is controlled by the server's CPU.

Client's CPU communicates directly with Server's CPU by means of an explicit network request (e.g., NVME-F command capsule), which, in turn, passes the request to the CNB. The explicit network request comprises an address that the client sends to the device. The device will then execute a TLP read/write from the local memory, responsive to the address that the client has sent.

In an embodiment, when the hybrid communication mode is operative, the server's CNB is configured to tunnel TLPs with the address that the client has sent, back to the client, using RDMA protocol.

As would be appreciated, the various communication modes described above are example modes cited by way of example and shown merely for the sake of conceptual clarity. Client-Server communication modes in accordance to the disclosed techniques are not limited to the description hereinabove. In alternative embodiments, other suitable modes may be used. For example, a client comprising a CNB may communicate with a server that does not comprise a CNB or comprises a CNB agent. In some embodiments, multiple CNBs may be used in a single server and/or a single client. Messages that are sent by a CNB may be sent by a NIC in response to a CNB control indication, or by a collaboration between a NIC and a CNB. A TLP may sometimes comprise a plurality of TLPs and a message may comprise a plurality of messages.

Multiple Queues and Coalescing

PCIe, by definition, enforces transactions ordering (write below refers to a posted write transaction); e.g., write transactions cannot bypass write, read cannot bypass write, write can bypass write and read can bypass read). In some embodiments of the present invention that support a weaker form of ordering in which ordering is guaranteed by the structure of the cache (e.g., the TLPs target the same cache-line or the same subset of the address range used in the cache, such as page), multiple concurrent queue-pairs may be invoked, and/or coalescing of WQEs may be used. (In some embodiments, compression of the WQEs may be used in addition or instead of coalescing; in an embodiments that WQEs may be encypted.)

FIG. 7A is a block diagram 700 that schematically illustrates PCIe tunneling with multiple concurrent queues, adhering to PCIe ordering rules, in accordance with an embodiment of the present invention. According to the example embodiment illustrated in FIG. 7A, a cross-network bridging apparatus maintains a single write queue 702, a first read-queue 704, a second read-queue 706 and a third read-queue 708. Write queue 702 comprises write requests that must be executed serially—the execution of a write request w0 710 must precede the execution of a write request w1 712, which must precede the execution of a write request w3 714.

Queues 704, 706 and 708 store requests that can be executed in parallel or at any order—a read request r0 716, a read request r2 718 and a read request r3 720. However, no read request may be executed before a network completion indication for the corresponding write is received (from the peer computer), indicating that the write request has been delivered.

To improve latency, in some embodiments, some of the read WQEs are stored in write-queue 702 and will be executed right after the preceding write-WQEs, without waiting for a completion indication. While reducing the latency, this technique also decreases queue parallelism and may decrease performance; hence, the amount of read WQEs which are stored in queue 702 should be carefully adjusted, according to the desired performance/latency tradeoff.

Thus, PCIe ordering rules are obeyed with concurrent queues.

FIG. 7B is a block diagram 750 that schematically illustrates PCIe tunneling with multiple concurrent queues, adhering to same cache-line (or cache address subset) ordering rules, in accordance with an embodiment of the present invention. In embodiments, same cache-line ordering rules imply that ordering should be kept only when the addresses of two accesses are in the same cache-line. The CNB may comprise a hash table, to quickly check if the two addresses are contained in the same cache-line, and, if so, order the cache accesses.

A first queue 752 stores a write-request W0 754, which is followed by (and, hence, must chronologically precede) a read request RO 756. A second queue 758 stores a write request W1 760; a third queue 762 stores a read request R2 764; and, a fourth queue 764 stores a read request R3 770, followed by a write request W3 772. According to the example embodiment illustrated in FIG. 7B, same cache-line ordering is guaranteed by a hash-based queue selection between the four queues.

Flush Indication

According to embodiments, when relaxed ordering (such as same-cache-line) is employed, the device may still occasionally require ordered execution. For example, the device may write a plurality of data records to memory with relaxed ordering, and then write a data-ready flag, indicating that all records are stored in memory. The data-ready should be written after all data-record writes are done.

To that end, in embodiments, the device is configured to issue a Flush indication, e.g., by sending a specific TLP, matching the requestor_id/address/pasid, or by a special CNB interface. The CNB is configured, when detecting a flush indication, to stop bridging write TLPs until the CNB receives network completion indications for all outstanding network requests.

Coalescing

According to embodiment of the present invention, a CLB may coalesce a plurality of TLPs; this may improve performance when the protocol headers are large relative to the data payload.

In the full and Single-End Tunneling SEND-Protocol communication modes described above, the CNB is configured to tunnel multiple TLPs in each SEND operation.

In the RDMA-based communication modes, for an RDMA-READ, the CNB is configured to:
- Maintain a list of groups (will be referred to hereinbelow as "sessions") of pending Read TLPs, wherein each session comprises TLPs in the same address range (e.g., the distance between the lowest address and the highest address in a session is not more than 1 Kbyte).
- Add new TLPs to existing sessions if the address of the TLPs is within the address range of an existing session; otherwise—open a new session for the TLP.
- Terminate a session when the size is large enough, or a timer has expired. Or number of TLPs; timer expired variations.
- For terminated sessions—merge the corresponding TLPs to a single (if possible—contiguous) TLP, encapsulate and send in an RDMA message.

In some embodiments, when strict PCIe ordering is required, the CNB is configured to coalesce write TLPs only if the transactions target consecutive addresses. In an embodiment, when same-cache-line-ordering is required, the CNB is configured to refrain from coalescing read and writes that are not mapped to the same cache-line. In embodiments, a session may terminate at a time when a first TLP is coalesced; in another embodiment the session terminates respective to the arrival time between TLPs. In some embodiments the session may terminate when the number of bytes or the number of TLPs (any TLP or TLP of a preset type) exceeds a preset threshold, a in yet other embodiments any other suitable criterion may be applied to terminate the session.

MSI-X Handling

PCIe-3 (and further revisions) supports Message-Signaled-Interrupt-Extended (MSI-X), facilitating the transfer of up to 2,048 interrupts, to a plurality of destinations through dedicated TLPs. CNBs according the embodiments of the present invention tunnel MSI-X TLPs to the peer computer.

Figure 8:
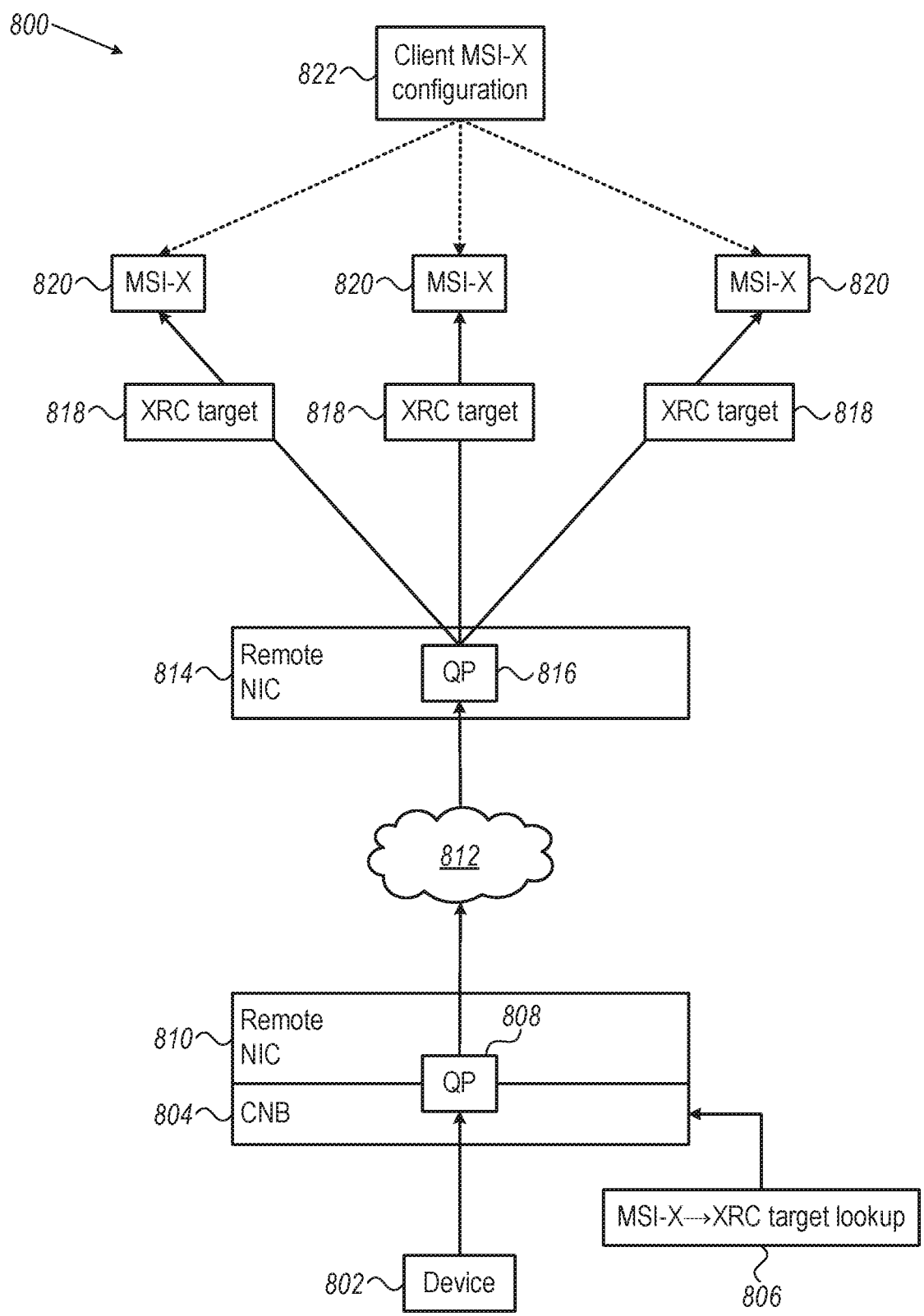
FIG. 8 is a block diagram that schematically illustrates PCIe Message-Base-Interrupt-Extended (MSI-X) tunneling, in accordance with an embodiment of the present invention.

FIG. 8 is a block diagram 800 that schematically illustrates PCIe MSI-X interrupt tunneling, in accordance with an embodiment of the present invention.

A device 802 generates PCIe MSI-X TLPs over a local PCIe bus. A CNB 804 identifies MSI-X transactions, and accesses a table 806 to translate the MSI-X TLP to a corresponding RDMA Extended Reliable Connection (XRC) message (in some embodiments, table 806 is not needed, and the CNB builds the message according to the address or the data of the PCIe MSI-X message).

A Queue-Pair 808 transmits the RDMA message, through a local NIC 810 and a network 812 to the client. In the client, a remote-NIC 812 directs the message to a queue-pair 816.

The single QP assures in-order execution; the XRC extended transport header (XRCETH) specifies an XRC target 818 in the client (e.g., different VMs), corresponding to the MSI-X target. The XRC targets send corresponding MSI-X interrupts to MSI-X circuits, which are pre-configured by a Client-MSI Configuration process 822. Each MSI-X circuit 820 may store the interrupt data corresponding to the interrupt data that the server has sent, for one of the pre-configured interrupt targets.

As would be appreciated, the server and client configurations for MSI-X tunneling illustrated in FIG. 8 are example configurations. Other suitable configurations may be used in alternative embodiments. For example, in some embodiments the client may comprise a CNB, which may translate the XRCs to MSI-C TLPs.

Figure 9:
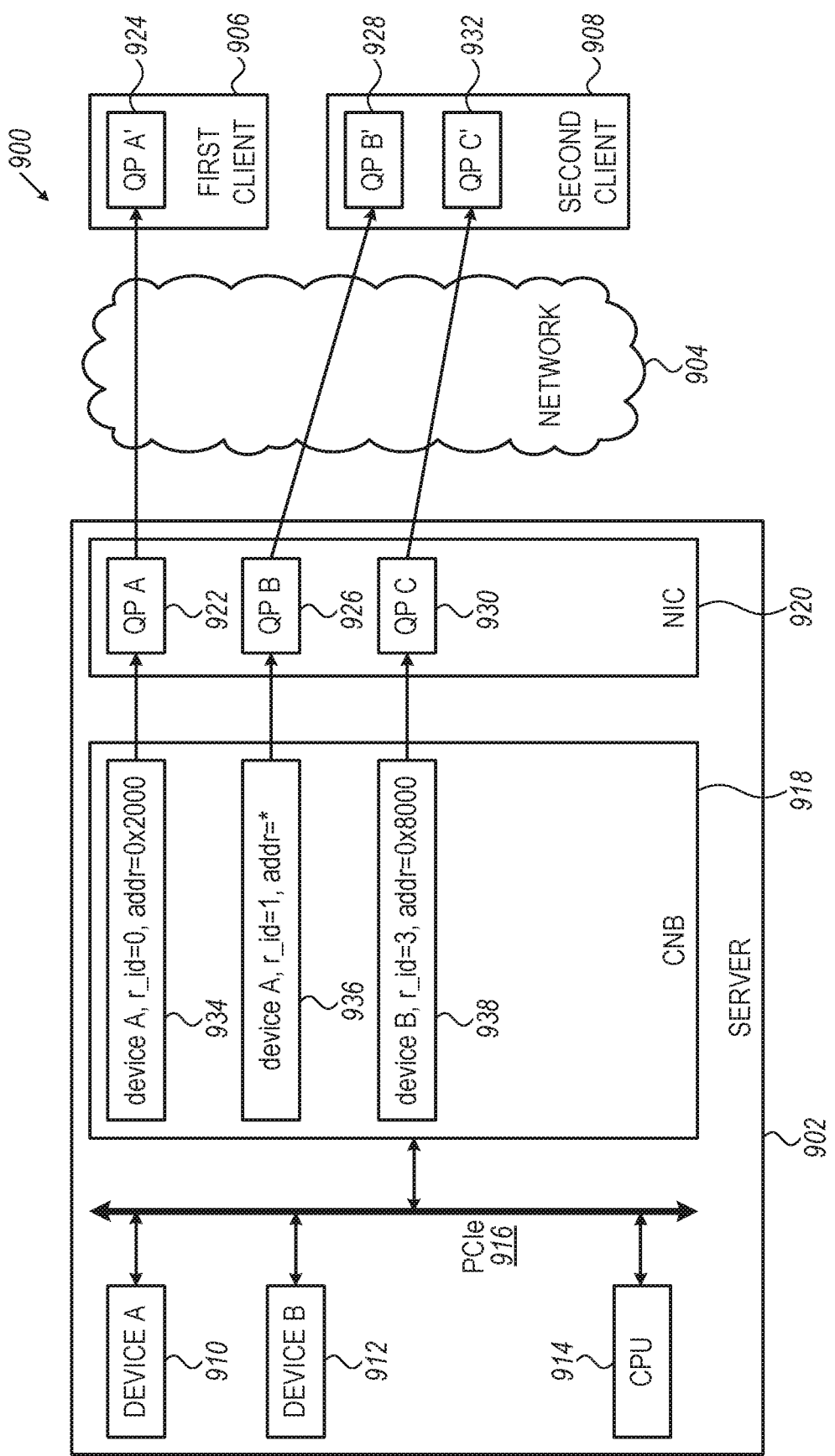
FIG. 9 is a block diagram that schematically illustrates message routing in a Cross-Network-Bridge (CNB), in accordance with an embodiment of the present invention.

FIG. 9 is a block diagram that schematically illustrates message routing 900 in a Cross-Network-Bridging apparatus, in accordance with an embodiment of the present invention. A server 902 communicates through a network 904 with a first client 906 and a second client 908. Server 902 comprises a device A 910, a device B 912 and a CPU 914. The devices and the CPU communicate through a PCIe system bus 916. Server 902 further comprises a CNB 918, which is configured to tunnel TLPs over the network to clients; and, a NIC 920.

According to the example embodiment illustrated in FIG. 9, the server allocates three queue-pairs (QPs) to communicate with corresponding QPs in a client computer—a QP A 922, which is configured to communicate over the network with a QP A' 924; a QP B 926, which is configured to communicate with a QP B' 928; and, a QP C 930, which is configured to communicate with a QP C' 932. QP A' is maintained by first client 906, whereas both QP B' 928 and QP C' 932 are maintained by second client 908.

CNB 918 is configured to monitor the PCIe bus and detect TLPs originated by one of devices 910, 912 and destined to a client computer. According to the example embodiment illustrated in FIG. 9, device A TLPs may be tunneled to a QP A' 924 in first client 906, or to QP B' 928 in second client 928, whereas device B TLPs may be tunneled to QP C' 932 in the second client only.

To that end, CNB 918 comprises match registers—a match register 934 stores QP A matching rules, a match register 936 stores QP B matching rules, and, a match register 938 stores QP C matching rules. According to the example embodiment illustrated in FIG. 9, the CNB steers TLPs to QP A if match register 934 detects a match—e.g., the PCIe TLPs are generated by device A, with a recipient id=0, and address=0x200. The CNB further steers TLPs to QP B if the TLPs are generated by device A, with a recipient id=1, regardless of the address (as defined by match register 938); and to QP B if the TLPs are generated by device B, with recipient id=3 and address=0x8000 (as defined by match register 938).

In the full tunneling configuration, the match registers in a client's CNB will be configured to match TLP addresses, wherein each address represents a remote BAR address. The match registers will match both the requestor ID and the address on the server side. In some embodiments, priority matching will be applied when conflicting matches occur; for example, 0 to 0x1000 can go to tunnel1, but 0x200-0x300 can override and go to tunnel2.

Generally, the comparison with the match registers are regarded as an example implementation of a predefined criterion that. The CNB translates and sends a given TLP only if the TLP matches the predefined criterion. It should be noted that if the CNB does not detect any match, the TLP is not tunneled (e.g., when the TLP points to a local PCIe address).

As would be appreciated, the configuration of server 902 and CNB 918 described above, with reference to FIG. 9, are example configurations cited by way of example and shown merely for the sake of conceptual clarity. Servers and CNBs in accordance with the disclosed techniques are not limited to the description hereinabove. In alternative embodiments, other suitable configurations may be used. For example, match registers 934, 936 and 938 may be stored in a hash-based RAM table, or in a Ternary-content-addressable memory (TCAM).

Figure 10:
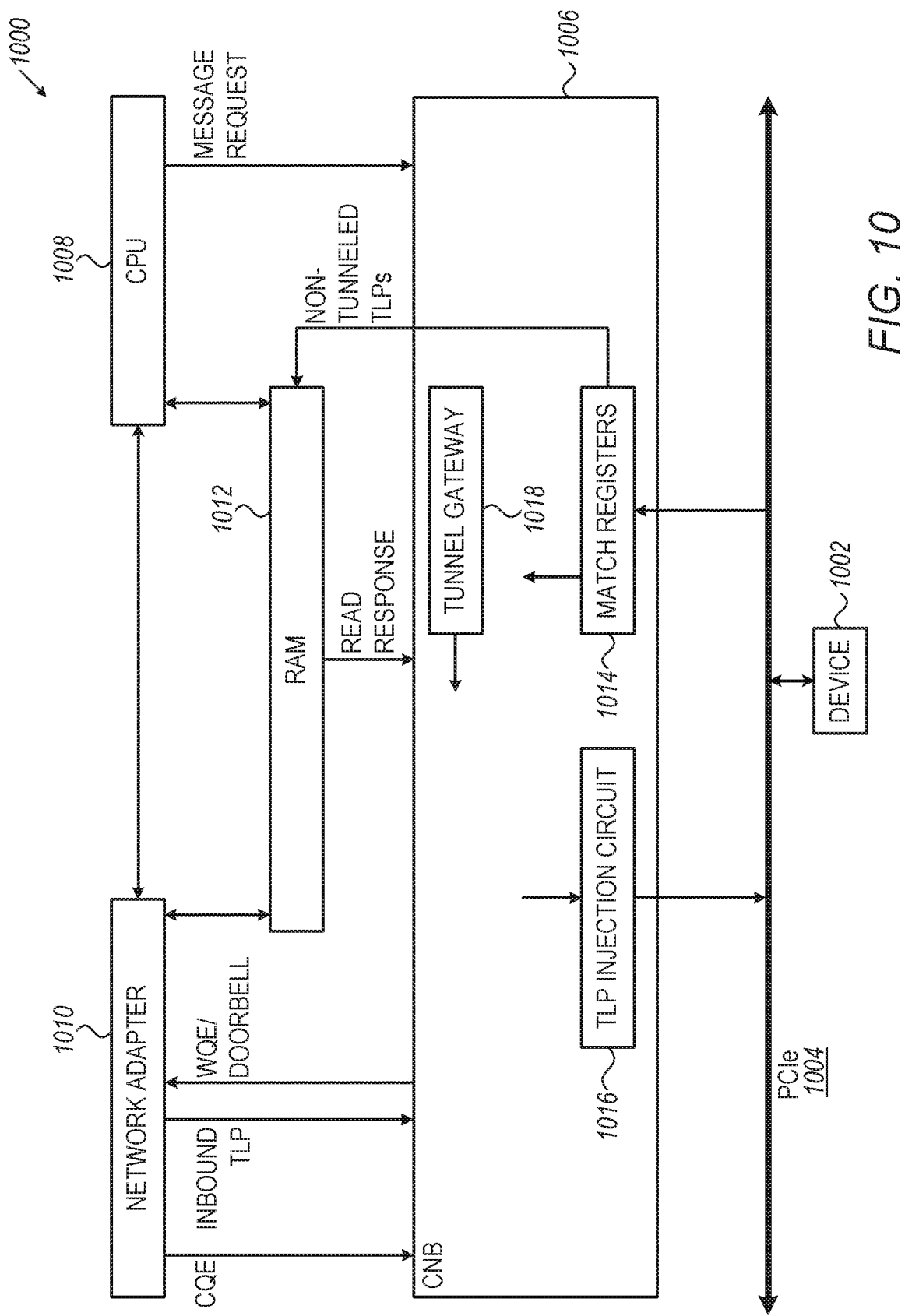
FIG. 10 is a block diagram that schematically illustrates a server computer with a CNB, in accordance with an embodiment of the present invention.

FIG. 10 is a block diagram that schematically illustrates a server 1000 with a Cross-Network-Bridge, in accordance with an embodiment of the present invention. The server comprises a device 1002 (such as a GPU or an SSD), a PCIe bus 1004, a CNB 1006, a CPU 1008 (e.g., ARM), a network adapter 1010 and a RAM 1012. The CNB comprises Match Registers 1014, a TLP Injection Circuit 1016 and a Tunnel Gateway 1018.

Match registers 1014 are configured to detect TLPs that should be tunneled to a client and signal such matched TLPs to other circuitry of the CNB. Match registers 1014 are further configured to steer other TLPs directly to the CPU.

In an embodiment, To send packets over the network, CNB 1006 generates Work-Queue Entries (WQEs) that correspond to the matched TLPs and outputs the WQEs to RAM 1012 (after writing each WQE record, the CNB may send a Doorbell indication). Network adapter 1010 reads the WQEs and, after completing previous (or higher priority) WQEs, sends the requested message over the network, and sends a corresponding Completion Queue Entry (CQE) to the CNB.

As would be appreciated, the work-queue mechanism described herein is cited by way of example. Alternative embodiments may use other mechanisms to communicate packet send/receive requests between the CPU and the network adapter.

To bridge the response read packet that the server receives, from the client to the device, the CPU is configured to send, via RAM 1012, a Read-Response indication to the CNB. The TLP Injection Circuit generates TLPs corresponding to the read response and injects the TLPs in the PCIe.

When the server receives a completion indication, CPU 1008 sends a corresponding indication to Tunnel-Gateway 1018 of CNB 1006, which will (in the TLP injection circuit) generate a TLP to indicate completion to the device.

According to the example embodiment illustrated in FIG. 10, CNB 1006 handles packet and TLP routing and control. The payload of the packets (and, in some embodiments, parts of the headers) transverse directly between the RAM and the PCIe, possibly through a circuitry that checks/adds check-sums, aligns data, corrects (incrementally or by recalculation) the TLP ECRC field to reflect changed requestor ID and TAG fields, etc. (such circuitry is not shown, for simplicity).

As would be appreciated, the configuration of server 1000 described above with reference to FIG. 10 is an example configuration cited by way of example and shown merely for the sake of conceptual clarity. Servers in accordance with the disclosed techniques are not limited to the description hereinabove. In alternative embodiments, for example, Match Registers 1014 may send non-tunneled TLPs directly to the Network Adapter rather than to the CPU. In another embodiment, the CNB writes doorbell records in RAM (or, for example, to an addressable location within the CNB), and sends a doorbell indication to Network Adapter 1010.

Figure 11:
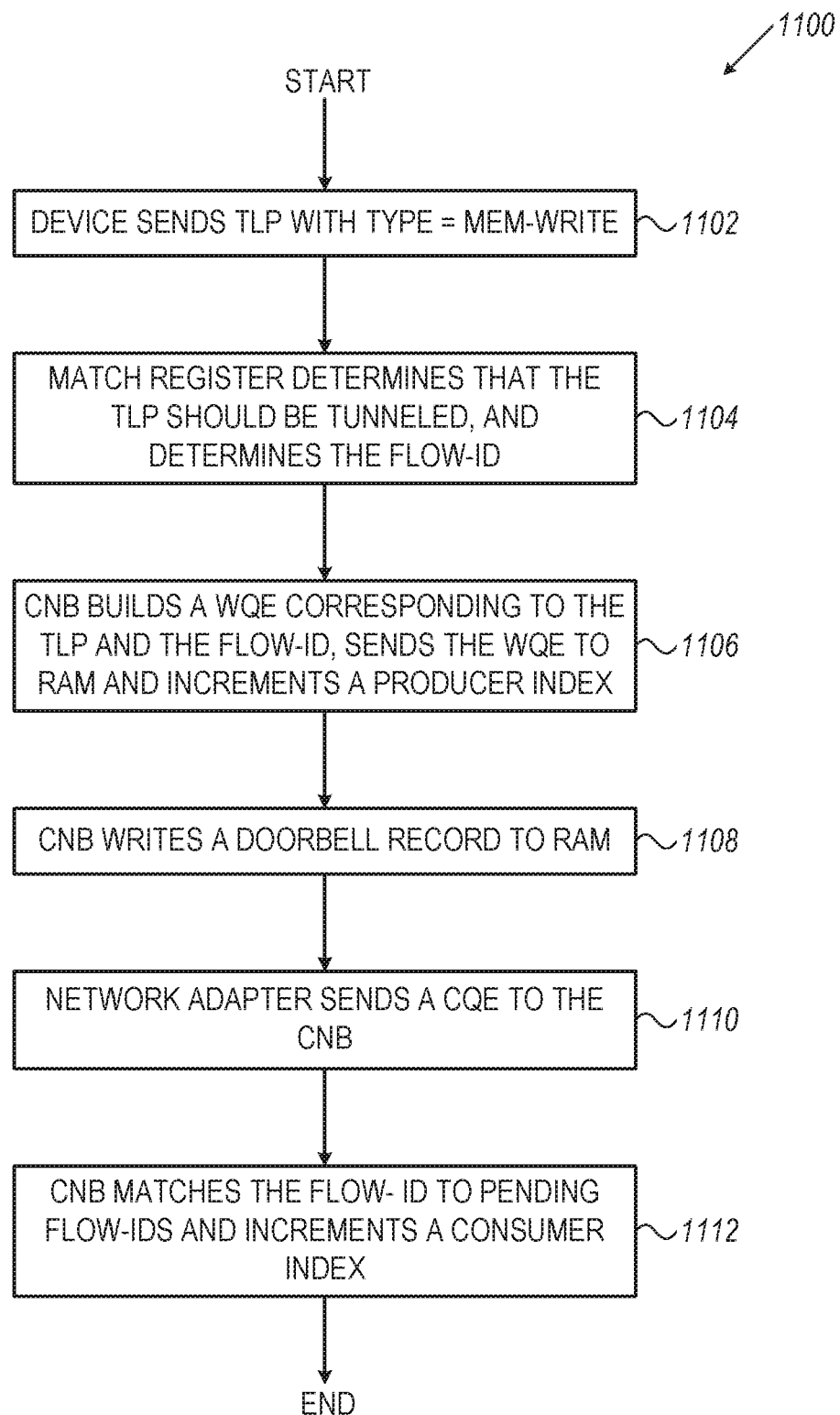
FIG. 11 is a flowchart that schematically illustrates a Single-End RDMA-based write-TLP flow, in accordance with an embodiment of the present invention.

FIG. 11 is a flowchart 1100 that schematically illustrates a single-End RDMA-based write-TLP flow, in accordance with an embodiment of the present invention. The flow is executed by server circuits that were described with reference to FIG. 10 (all server circuits and designated unit numbers in the description hereinbelow refer to FIG. 10).

The flow starts at a SEND-TLP step 1102, wherein device 1002 initiates a write-TLP over the PCIe bus. Next, in a Determine-Tunneling step 1104, match register 1014 compares the TLP header to pre-stored comparison data, determines whether the TLP should be tunneled, and, if so, sets the flow-ID according to routing information stored in the match registers (the flow-ID may indicate one of the opened QPs).

If the TLP should be tunneled, the CNB builds, in a Building WQE step 1106, a WQE that corresponds to the TLP, sends the WQE to RAM 1012, and increments a Producer Index. Next, at a Sending Doorbell step 1108, the CNB writes a doorbell record in RAM, corresponding to the flow parameters, and sends a doorbell indication.

After the network controller sends the packet, the network controller sends, in a Sending CQE step 1110, a CQE to the CNB, indicating that the corresponding WQE is completed. The CNB, in a Matching Flow-ID step 1112, checks the CQE, compares the flow-ID to flow-IDs of all pending WQEs, and increments a corresponding consumer index. After step 1112 the flow ends. (The producer and consumer indexes mentioned above are useful for the matching of a WQE to a CQE, which may be received out-of-order.)

Figure 12:
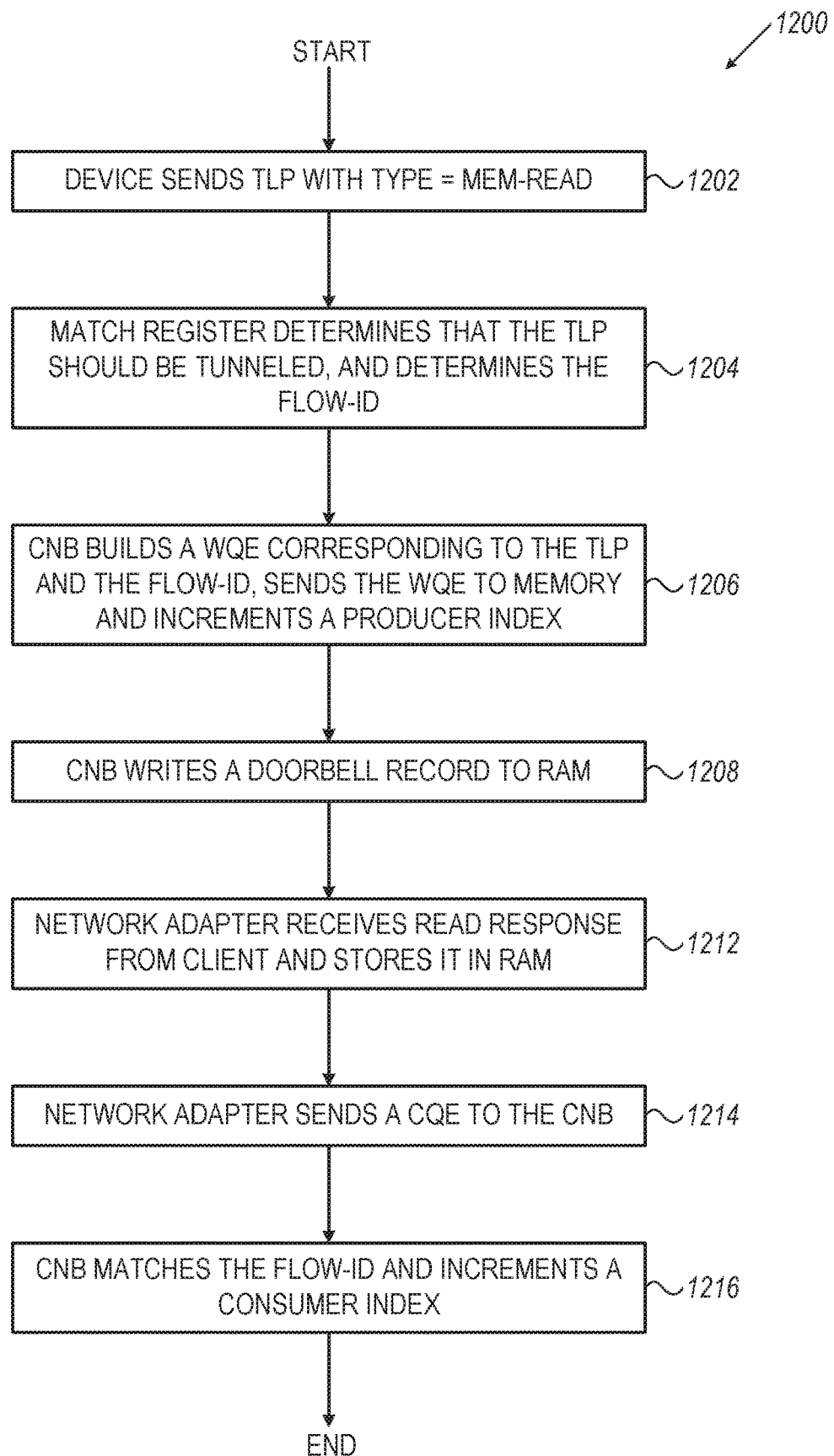
FIG. 12 is a flowchart that schematically illustrates a Single-End RDMA-based read-TLP flow, in accordance with an embodiment of the present invention.

FIG. 12 is a flowchart 1200 that schematically illustrates a Single-End RDMA-Based read-TLP flow, in accordance with an embodiment of the present invention. Like the write-TLP example described with reference to FIG. 11, The read-TLP flow is executed by server circuits that were described with reference to FIG. 10, and all unit references in the description hereinbelow refer to the circuits which were defined therein. Some of the steps below may be identical to steps of flow 1100.

The flow starts at a SEND-TLP step 1202, wherein device 1002 initiates a read-TLP over the PCIe bus. Next, in a Determine-Tunneling step 1204, match register 1014 compares the TLP header to pre-stored comparison data, determines whether the TLP should be tunneled, and, if so, sets a flow-ID.

If the TLP should be tunneled, the CNB builds, in a Building WQE step 1206, a WQE that corresponds to the TLP, sends the WQE to RAM 1012, and increments a Producer Index. Next, at a Sending Doorbell step 1208, the CNB writes a doorbell record in RAM, corresponding to the flow parameters, and sends a doorbell indication.

At a Receiving Read Response step 1212, network adapter 1010 receives a response packet from the client and stores the response in RAM 1012. Next, in a Send CQE step 1214, the network adapter sends a CQE to the CNB. Lastly, in a Matching Flow-ID step 1216, the CNB checks the CQE, compares the flow-ID to flow-IDs of all pending WQEs, and increments a corresponding consumer index. After step 1216 the flow ends.

As would be appreciated, the flowcharts illustrated in FIGS. 11, 12 are example flowcharts that are cited by way of example and shown merely for the sake of conceptual clarity. Flowcharts in accordance with the disclosed techniques are not limited to the description hereinabove. In alternative embodiments, for example, The CNB may communicate directly with Network adapter circuitry (not via WQE/CQE), may skip doorbell record update state, may send to a queue being polled by the local CPU and handled in software.

The techniques described hereinabove are also applicable for remote analysis of PCIe transactions, which may be done over a network.

Figure 13:
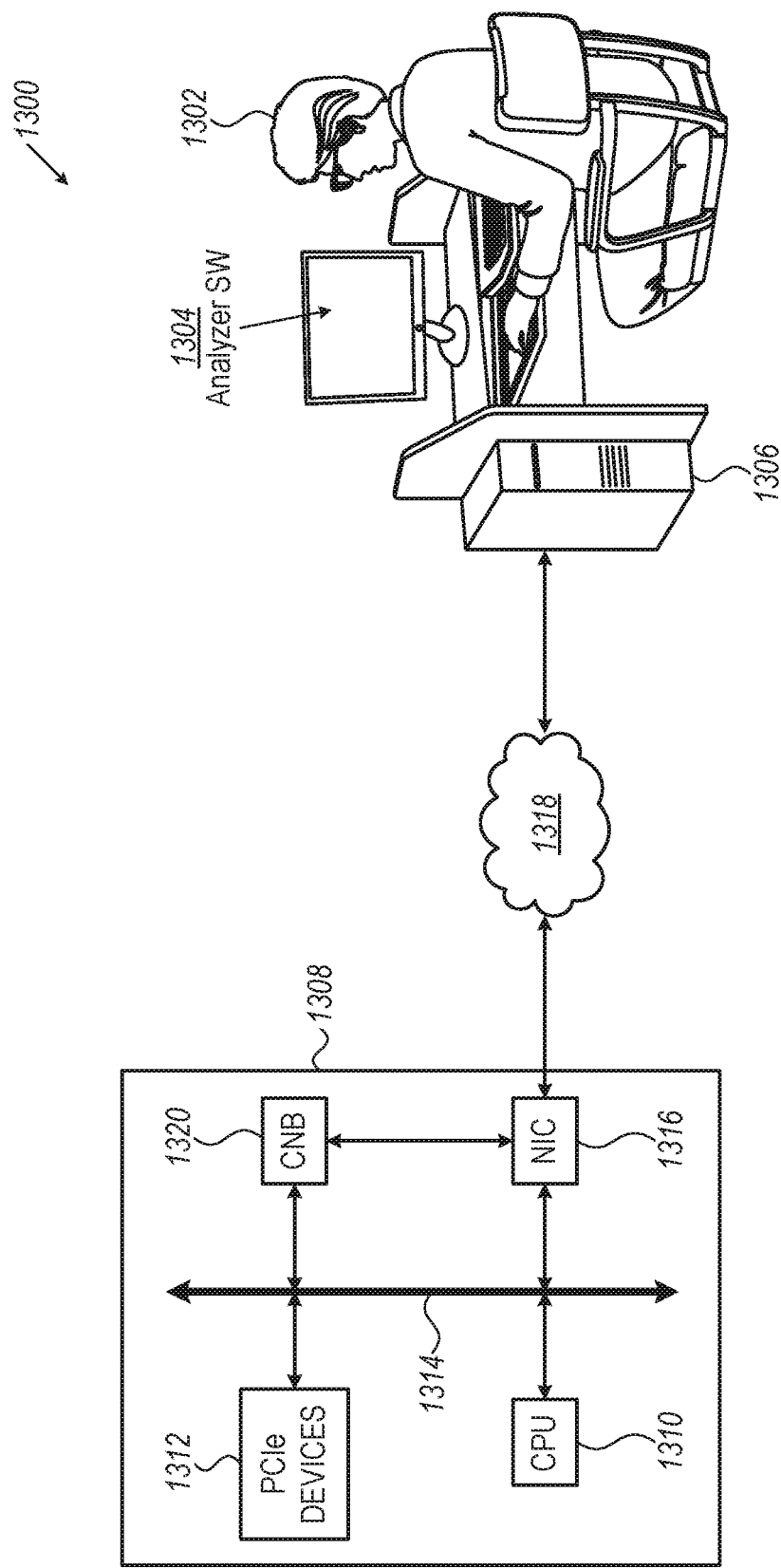
FIG. 13 is a block diagram that schematically illustrates remote PCIe analysis, in accordance with an embodiment of the present invention.

FIG. 13 is a block diagram that schematically illustrates remote PCIe analysis, in accordance with an embodiment of the present invention. A user 1302 runs a PCIe analysis software 1304 on a remote computer 1306, to remotely analyze TLPs in a computer 1308 over a communication network. Computer 1308 comprises a CPU 1310, PCIe devices 1312, a PCIe bus 1314, and a NIC 1316 that is coupled to a network 1318.

According to the example embodiment illustrated in FIG. 13, computer 1308 further comprises a CNB 1320, which is configured to tunnel TLPs over network 1318 to remote computer 1306.

For remote PCIe analysis of PCIe 1314 of computer 1308 by remote computer 1306, any of the Single-End communication modes described hereinabove can be used. The analyzer software activates an agent that runs on CPU 1310, which can configure CNB 1320 and NIC 1316 to tunnel selected TLPs to the remote computer, allowing the analysis software to observe TLPs in computer 1308.

In some embodiment, remote computer 1306 may comprise a CNB, and full tunneling communication modes may be used, for better performance.

As would be appreciated, the remote PCIe analysis configuration described above with reference to FIG. 13 is cited by way of example and shown merely for the sake of conceptual clarity. Remote PCIe analysis in accordance with the disclosed techniques is not limited to the description hereinabove. In alternative embodiments, other suitable configurations may be used. For example, in some embodiment there is no user 1302 (e.g., remote PCIe analysis is done automatically at preset intervals, and failures only are alerted to system administrators).

The configurations, flowcharts and sequence diagrams described hereinabove and illustrated in FIGS. 1 through 13 are examples that are shown purely for the sake of conceptual clarity. Any other suitable configurations, flowcharts and sequence-diagrams can be used in alternative embodiments. For example, any or all the NICs described may be embodied, for example, in a communication switch, a router, a server with switching capabilities or aggregation of network elements. The different elements of the server and the client, including the CNB, CNB elements such as interfaces and bridging circuitry, the CNB agent and the NIC, may be implemented using suitable hardware, such as in one or more Application-Specific Integrated Circuits (ASICs) or Field-Programmable Gate Arrays (FPGAs), using software, using hardware, or using a combination of hardware and software elements.

All computers, processors, CPUs and the like, described in the foregoing, may comprise one or more general-purpose processors, which are programmed in software to carry out the functions described herein. The software may be downloaded to the processors in electronic form, over a network or from a host, for example, or it may, alternatively or additionally, be provided and/or stored on non-transitory tangible media, such as magnetic, optical, or electronic memory.

Although the embodiments described herein mainly address TLP bridging over a communication network, the methods and systems described herein can also be used in other applications, such as in device emulation.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A cross-network bridging apparatus, comprising:
a bus interface for connecting to a system bus; and
bridging circuitry, configured to:
translate between (i) system-bus transactions that are exchanged between one or more local devices that are coupled to the system bus and served by the system bus and one or more remote processors located across a network from the apparatus, and (ii) data units that are formatted as network packets and convey the system-bus transactions; and
transmit and receive the network packets to and from a network adapter for transmission and reception over the network to and from the remote processors, including maintaining a plurality of Queue Pairs (QPs), each QP assigned to a respective connection between a respective local system bus device and a respective remote processor, and transmitting and receiving the network packets by scheduling the plurality of the QPs.

2. The apparatus according to claim 1, wherein one or more of the local devices comprises a Graphics Processing Unit (GPU).

3. The apparatus according to claim 1, wherein one or more of the local devices comprises a storage device, and wherein one or more of the network packets comprises an NVMe-over-fabrics (NVMe-F) command.

4. The apparatus according to claim 1, wherein the bridging circuitry is configured to maintain a plurality of work-queue elements that are queued in the QPs, wherein each work-queue element is configured to define one or more of the system-bus transactions.

5. A cross-network bridging apparatus, comprising:
a bus interface for connecting to a system bus; and
bridging circuitry, configured to translate between (i) system-bus transactions that are exchanged between one or more local devices that are coupled to the system bus and served by the system bus and one or more remote processors located across a network from the apparatus, and (ii) data units that convey the system-bus transactions, for transmitting and receiving as network packets over the network to and from the remote processors,
wherein the bridging circuitry is further configured to:
produce a data unit by coalescing two or more of the system-bus transactions in a single work-queue element;
write outbound data units to a memory for transmission as network packets over the network; and
read from the memory inbound data units that were received over the network as network packets.

6. The apparatus according to claim 1, wherein, in translating between the data units and the system-bus transactions, the bridging circuitry is configured to modify one or more attributes of one or more of the system-bus transactions.

7. The apparatus according to claim 1, wherein the system bus comprises a peripheral component interconnect express (PCIe) bus.

8. The apparatus according to claim 1, wherein the system-bus transactions comprise PCIe Transaction Layer Packets (TLPs).

9. The apparatus according to claim 1, wherein the system bus comprises a compute express link (CXL) bus or an Nvlink bus.

10. The apparatus according to claim 1, wherein the data units comprise layer-3 network packets.

11. The apparatus according to claim 1, wherein the system-bus transactions comprise PCIe transactions, and wherein the data units comprise Remote Direct Memory Access (RDMA) packets.

12. The apparatus according to claim 1, wherein the system-bus transactions comprise PCIe transactions, and wherein the data units are to be transmitted as SEND message packets.

13. The apparatus according to claim 1, wherein the bridging circuitry is configured to identify that one or more of the system-bus transactions comprise Message-Signaled-Interrupts (MSI-X), and in response to the identifying, to translate the system-bus transactions comprising the MSI-X into one or more RDMA Extended Reliable Connection (XRC) messages.

14. The apparatus according to claim 1, wherein the bridging circuitry is configured to translate a given system-bus transaction only in response to identifying that the given system-bus transaction matches a predefined criterion.

15. The apparatus according to claim 1, wherein the bridging circuitry is configured to translate a given system-bus transaction only in response to identifying that the given system-bus transaction is not exchanged with a local system-bus address.

16. The apparatus according to claim 1, wherein at least one of the local devices comprises a physical device served by the system bus.

17. The apparatus according to claim 16, wherein one or more of the local devices comprise virtualized devices assigned in the physical device.

18. The apparatus according to claim 1, wherein, in translating between the data units and the system-bus transactions, the bridging circuitry is configured to translate between network addresses appearing in the data units and corresponding device addresses appearing in the system-bus transactions.

19. A cross-network bridging apparatus, comprising:
a bus interface for connecting to a system bus; and
bridging circuitry, configured to:
   translate between (i) system-bus transactions that are exchanged between a local processor that is coupled to the system bus and served by the system bus and one or more remote devices located across a network from the apparatus, and (ii) data units that are formatted as network packets and convey the system-bus transactions; and
   transmit and receive the network packets to and from a network adapter for transmission and reception over the network to and from the remote devices, including maintaining a plurality of Queue Pairs (QPs), each QP assigned to a respective connection between a respective local system bus device and a respective remote processor, and transmitting and receiving the network packets by scheduling the plurality of the QPs.

20. A remote system bus analysis apparatus, comprising:
a first computer comprising a system bus;
a Cross-Network Bridge (CNB), configured to translate system-bus transactions that are exchanged over the system bus into network packets, and to transmit the network packets over a network, including maintaining a plurality of Queue Pairs (QPs), each QP assigned to a respective connection between a respective local system bus device and a respective remote processor, and transmitting and receiving the network packets by scheduling the plurality of the QPs; and
a second computer, configured to receive the network packets from the CNB over the network, to extract the system-bus transactions, exchanged over the system bus of the first computer, from the received network packets, and to analyze the system-bus transactions.

21. The system according to claim 20, wherein the system bus comprises a peripheral component interconnect express (PCIe) bus.

22. A cross-network bridging method, comprising:
operating one or more local devices that are coupled to a system bus and served by the system bus; and
using bridging circuitry:
   translating between (i) system-bus transactions that are exchanged between the one or more local devices and one or more remote processors located across a network, and (ii) data units that are formatted as network packets and convey the system-bus transactions; and
   transmitting and receive the network packets to and from a network adapter for transmission and reception over the network to and from the remote processors, including maintaining a plurality of Queue Pairs (QPs), each QP assigned to a respective connection between a respective local system bus device and a respective remote processor, and transmitting and receiving the network packets by scheduling the plurality of the QPs.

23. The method according to claim 22, wherein one or more of the local devices comprises a Graphics Processing Unit (GPU).

24. The method according to claim 22, wherein one or more of the local devices comprises a storage device, and wherein one or more of the network packets comprises an NVMe-over-fabrics (NVMe-F) command.

25. The method according to claim 22, wherein maintaining the QPs comprises maintaining a plurality of work-queue elements that are queued in the QPs, wherein each work-queue element is configured to define one or more of the system-bus transactions.

26. The method according to claim 22, wherein translating between the system-bus transactions and the data units comprises producing a data unit by coalescing two or more of the system-bus transactions in a single work-queue element.

27. The method according to claim 22, and comprising writing outbound data units to a memory for transmission as network packets over the network, and reading from the memory inbound data units that were received over the network as network packets.

28. The method according to claim 22, wherein translating between the data units and the system-bus transactions comprises modifying one or more attributes of one or more of the system-bus transactions.

29. The method according to claim 22, wherein the system bus comprises a peripheral component interconnect express (PCIe) bus.

30. The method according to claim 22, wherein the system-bus transactions comprise PCIe Transaction Layer Packets (TLPs).

31. The method according to claim 22, wherein the system bus comprises a compute express link (CXL) bus or an Nvlink bus.

32. The method according to claim 22, wherein the data units comprise layer-3 network packets.

33. The method according to claim 22, wherein the system-bus transactions comprise PCIe transactions, and wherein the data units comprise Remote Direct Memory Access (RDMA) packets.

34. The method according to claim 22, wherein system-bus transactions comprise PCIe transactions, and wherein the data units are to be transmitted as SEND message packets.

35. The method according to claim 22, wherein translating between the system-bus transactions and the data units comprises identifying that one or more of the system-bus transactions comprise Message-Signaled-Interrupts (MSI-X), and in response to the identifying, translating the system-bus transactions comprising the MSI-X into one or more RDMA Extended Reliable Connection (XRC) messages.

36. The method according to claim 22, wherein translating between the system-bus transactions and the data units comprises translating a given system-bus transaction only in response to identifying that the given system-bus transaction matches a predefined criterion.

37. The method according to claim 22, wherein translating between the system-bus transactions and the data units comprises translating a given system-bus transaction only in response to identifying that the given system-bus transaction is not exchanged with a local system-bus address.

38. The method according to claim 22, wherein at least one of the local devices comprises a physical device served by the system bus.

39. The method according to claim 38, wherein one or more of the local devices comprise virtualized devices assigned in the physical device.

40. The method according to claim 22, wherein translating between the data units and the system-bus transactions comprises translating between network addresses appearing in the data units and corresponding device addresses appearing in the system-bus transactions.

41. A cross-network bridging method, comprising:
operating a local processor that is coupled to a system bus and served by the system bus; and
using bridging circuitry:
translating between (i) system-bus transactions that are exchanged between the local processor and one or more remote devices located across a network, and (ii) data units that are formatted as network packets and convey the system-bus transactions; and
transmitting and receive the network packets to and from a network adapter for transmission and reception over the network to and from the remote devices, including maintaining a plurality of Queue Pairs (QPs), each QP assigned to a respective connection between a respective local system bus device and a respective remote processor, and transmitting and receiving the network packets by scheduling the plurality of the QPs.

42. The method according to claim 41, wherein and comprising writing outbound data units to a memory for transmission as network packets over the network, and reading from the memory inbound data units that were received over the network as network packets.

43. A remote system bus analysis method, comprising:
using a Cross-Network Bridge (CNB), translating system-bus transactions that are exchanged over a system bus of a first computer into network packets, and transmitting the network packets over a network, including maintaining a plurality of Queue Pairs (QPs), each QP assigned to a respective connection between a respective local system bus device and a respective remote processor, and transmitting and receiving the network packets by scheduling the plurality of the QPs; and
in a second computer, receiving the network packets from the CNB over the network, extracting the system-bus transactions, exchanged over the system bus of the first computer, from the received network packets, and analyzing the system-bus transactions.

44. The method according to claim 43, wherein the system bus comprises a peripheral component interconnect express (PCIe) bus.

* * * * *